(12) United States Patent
Wang

(10) Patent No.: US 6,909,903 B2
(45) Date of Patent: Jun. 21, 2005

(54) METHOD AND SYSTEM FOR LOCATION-AWARE WIRELESS MOBILE DEVICES INCLUDING MOBILE USER NETWORK MESSAGE INTERFACES AND PROTOCOL

(75) Inventor: Ray Wang, McLean, VA (US)

(73) Assignee: 3E Technologies International, Inc., Rockville, MD (US)

( * ) Notice: Subject to any disclaimer, the term of this patent is extended or adjusted under 35 U.S.C. 154(b) by 634 days.

(21) Appl. No.: 09/909,336

(22) Filed: Jul. 19, 2001

(65) Prior Publication Data

US 2002/0160745 A1 Oct. 31, 2002

Related U.S. Application Data

(60) Provisional application No. 60/219,508, filed on Jul. 20, 2000.

(51) Int. Cl.[7] .................................................. H04Q 7/20
(52) U.S. Cl. ............................... 455/456.1; 455/456.3; 455/456.5; 455/404.1; 455/414.1
(58) Field of Search ........................... 455/456.1, 456.3, 455/456.5, 404.1, 414.1

(56) References Cited

U.S. PATENT DOCUMENTS

| | | | |
|---|---|---|---|
| 5,636,245 A | | 6/1997 | Ernst et al. |
| 5,809,415 A | | 9/1998 | Rossmann |
| 6,028,514 A | | 2/2000 | Lemelson et al. |
| 6,360,172 B1 | | 3/2002 | Burfeind et al. |
| 6,477,362 B1 | * | 11/2002 | Raith et al. ............... 455/404.1 |
| 6,505,046 B1 | * | 1/2003 | Baker ....................... 455/456.3 |
| 6,529,728 B1 | * | 3/2003 | Pfeffer et al. ............... 455/418 |
| 6,574,484 B1 | * | 6/2003 | Carley ........................ 455/521 |
| 6,609,005 B1 | * | 8/2003 | Chern ........................ 455/457 |
| RE38,267 E | * | 10/2003 | Borkowski et al. ...... 455/456.1 |

FOREIGN PATENT DOCUMENTS

| | | |
|---|---|---|
| GB | 2271486 A | 4/1994 |
| WO | WO 98/08314 | 7/1997 |

OTHER PUBLICATIONS

Timothy A. Budd, "Protecting And Managing Electronic Content With A Digital Battery", Computer, Aug. 2001, pp. 24–30.

(Continued)

*Primary Examiner*—Sonny Trinh
*Assistant Examiner*—Huy Phan
(74) *Attorney, Agent, or Firm*—Lesavich High-Tech Law Group, P.C.; Stephen Lesavich

(57) ABSTRACT

A method and system for location-aware wireless mobile devices including a mobile user network interfaces and protocol. A network-independent location-aware network protocol provides communication with location-aware wireless mobile devices. The protocol is network-independent to support and deliver location-aware services over virtually any wireless or wired network transparently regardless of the protocols being used on a transport network. The protocol is location-aware of current geographic locations of plural wireless mobile devices. Alert information is provided to a location-aware wireless mobile device with the network-independent location-aware network protocol and interfaces. Location-aware wireless mobile devices are located and provided with alert information with the network-independent location-aware network protocol and interfaces. The method, system, interfaces and protocol may help improve usability of mobile devices by allowing the mobile devices to be location-aware.

23 Claims, 16 Drawing Sheets

OTHER PUBLICATIONS

Want et al., "Expanding The Horizons Of Location–Aware Computing", Computer, Aug. 2001, pp. 31–34.

Davies et al., "Using And Determining Location In A Context–Sensitive Tour Guide", Computer, Aug. 2001, pp. 35–41.

Pradhan et al., "Websigns: Hyperlinking Physical Locations To The Web", Computer, Aug. 2001, pp. 42–48.

Addlesee et al., "Implementing A Sentient Computing System", Computer, Aug. 2001, pp. 50–56.

Hightower et al., "Location Systems For Ubiquitous Computing", Computer, Aug. 2001, pp. 57–66.

International Search Report Mailed Oct. 2, 2002.

Dealfinder: A Collaborative, Location–Aware Mobile Shopping Application, Wesley Chan, MIT Media Laboratory, Dec. 8, 2000.

* cited by examiner

LOCATION-AWARE
MESSAGE LAYOUT

USER IDENTIFIER
LAYOUT

MESSAGE IDENTIFIER
LAYOUT

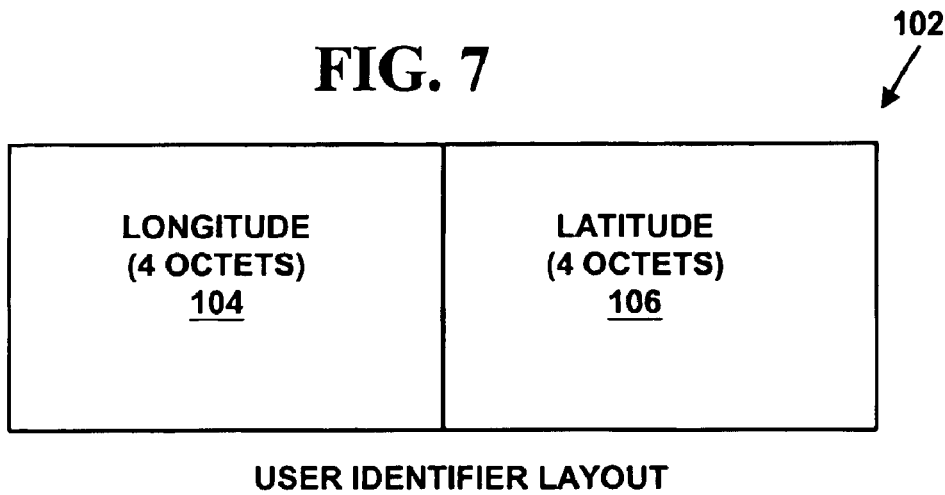
USER IDENTIFIER LAYOUT
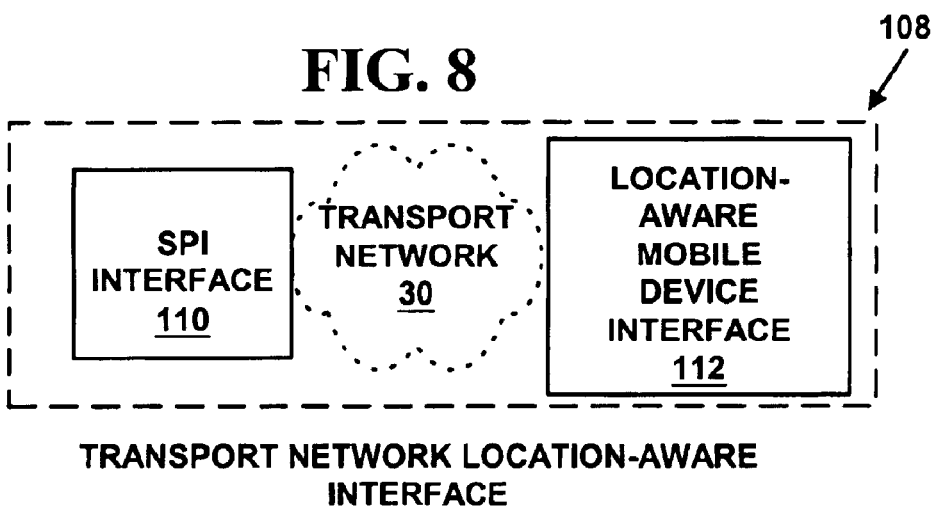
TRANSPORT NETWORK LOCATION-AWARE INTERFACE
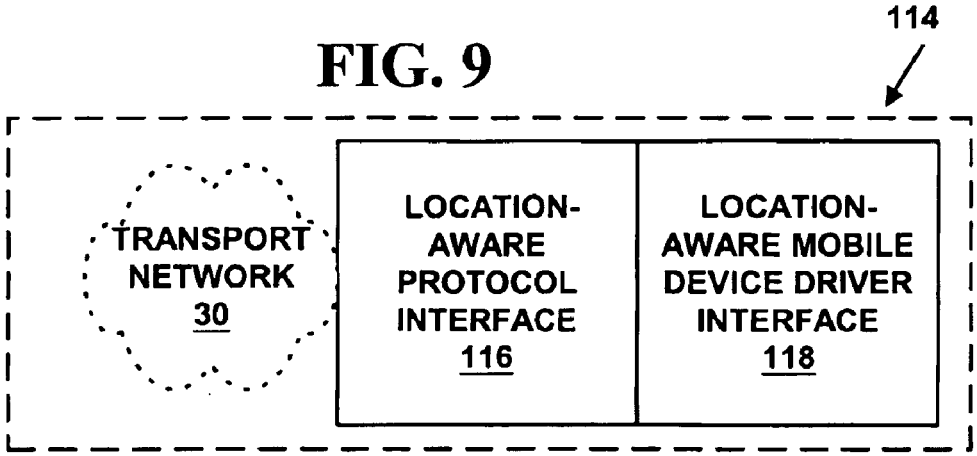
MOBILE DEVICE LOCATION-AWARE INTERFACE

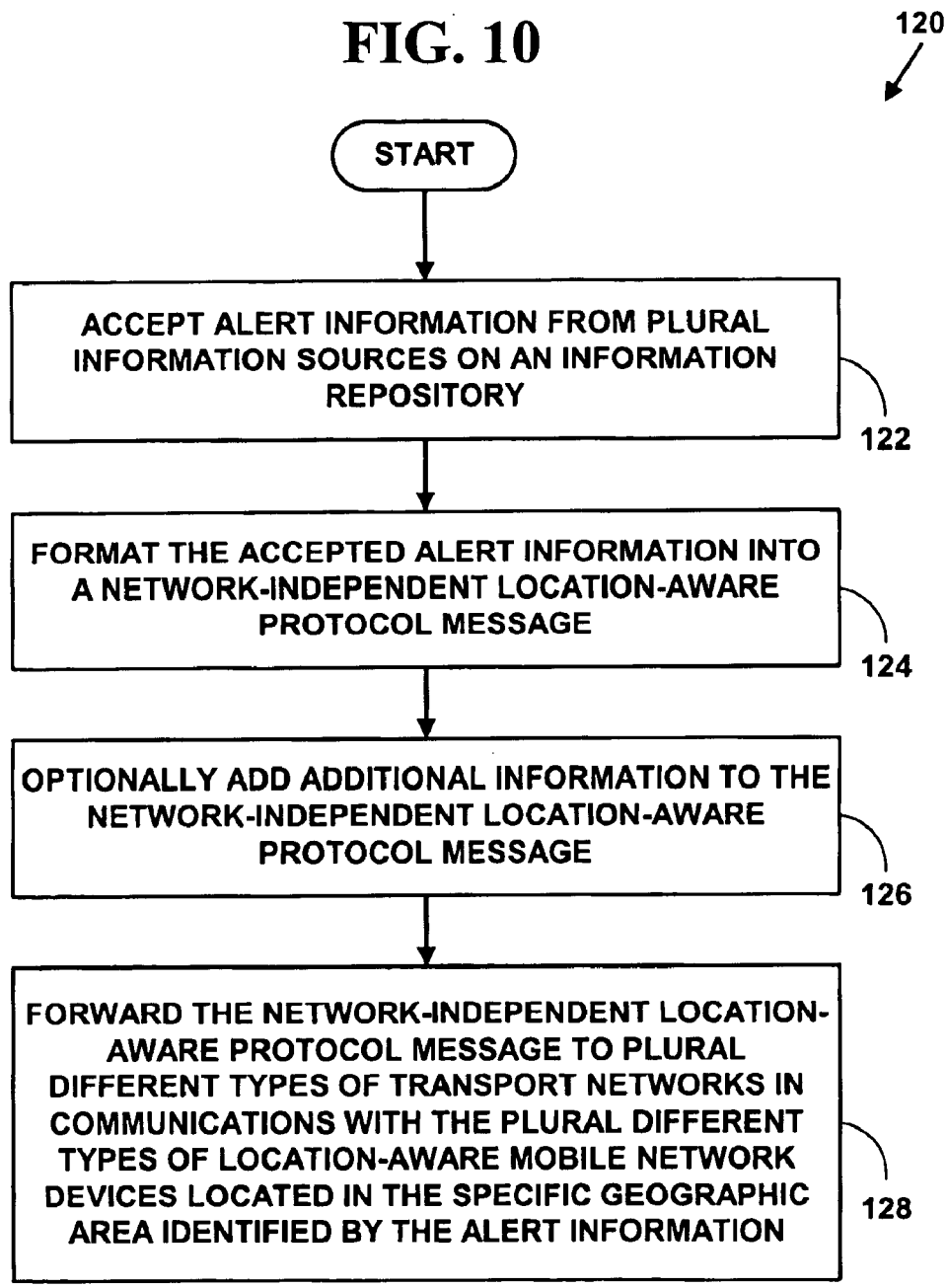

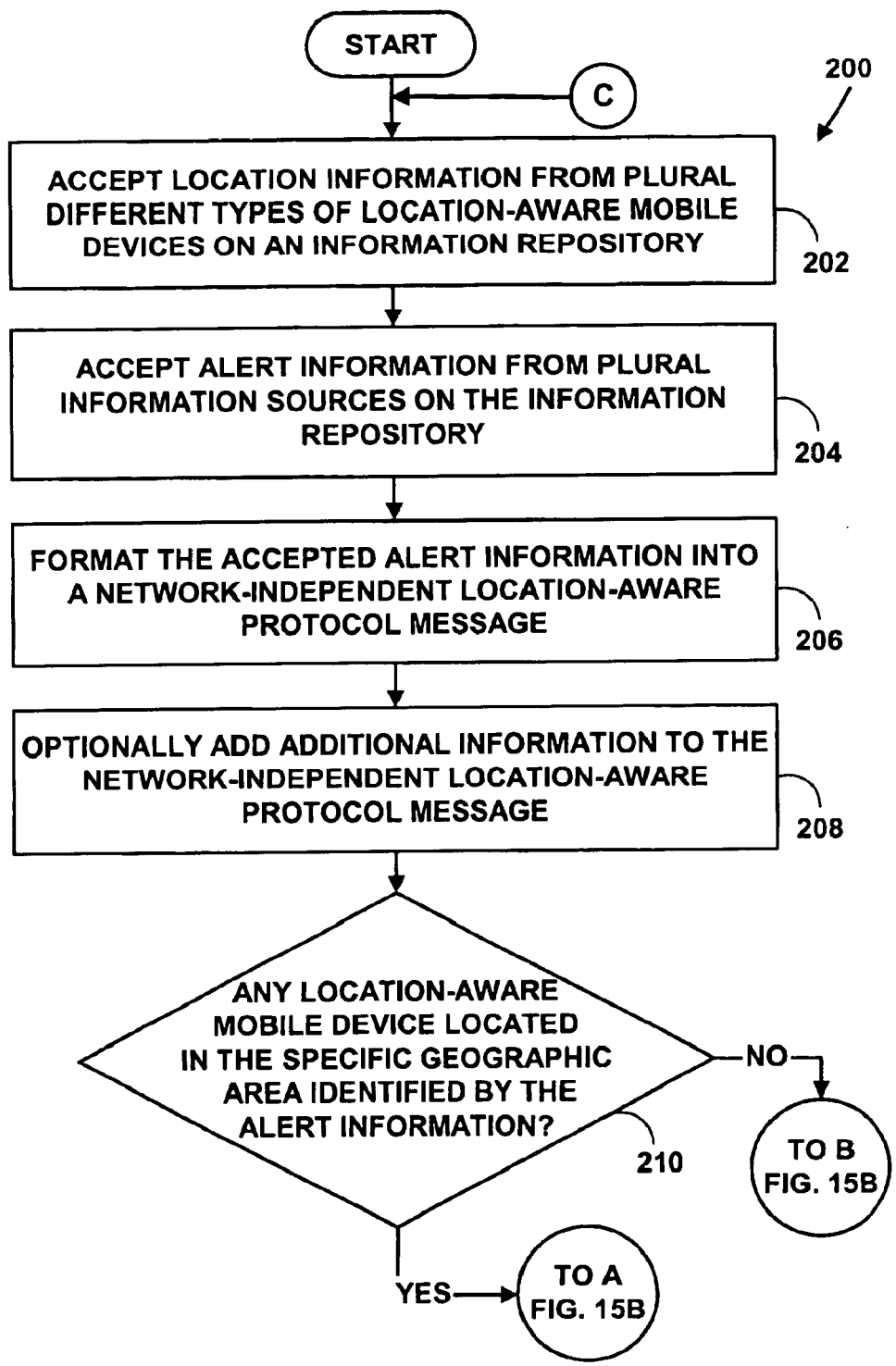

METHOD AND SYSTEM FOR LOCATION-AWARE WIRELESS MOBILE DEVICES INCLUDING MOBILE USER NETWORK MESSAGE INTERFACES AND PROTOCOL

CROSS REFERENCES TO RELATED APPLICATIONS

This utility application claims priority from U.S. Provisional Application 60/219,508, filed on Jul. 20, 2000.

FIELD OF THE INVENTION

This application relates to mobile devices. More specifically, this invention relates to a method and system for location-aware mobile devices including mobile user network interfaces and protocol.

BACKGROUND OF THE INVENTION

There are many different types of wireless mobile devices being used in the world today including mobile phones, personal digital assistants, hand-held devices, etc. Wireless transport networks allow electronic content and electronic commerce information to be served and used on wireless mobile devices.

There are a number of problems associated with providing electronic content and electronic commerce information to wireless mobile devices.

One problem is that there are a large variety of wireless mobile devices being used today. It is difficult to provide electronic content and electronic commerce information in a format usable on all varieties of devices.

Another problem is that many mobile devices are not "location-aware." Location-aware devices are aware of their current geographic location. Mobile telephones and Global Positioning System ("GPS") devices may be aware of their current geographic location. GPS devices typically determine their current geographic location by communicating with satellites. Mobile telephones typically may determine their current geographic location by communicating with a particular mobile phone interface or telephony switch that provides coverage to a geographic location such as a telephony "cell."

However, knowing a current geographic location is not useful if there is no association with a server that is capable of sending location-dependent information to the mobile device. For example, a user may have a mobile GPS device that is aware of it current geographic location and a severe weather event may be occurring in the geographic area. The mobile GPS device will have no way of accepting location-dependent information including the severe weather event.

Another problem is that there are a variety of transport protocols being used to communicate with wireless mobile devices. The variety of transport protocols makes it difficult to communicate with all varieties of devices.

Another problem is that because of the large number of protocols used with mobile devices, there is no standard interface for accepting electronic content and electronic commerce information on a wide variety of location-aware wireless mobile devices.

Another problem is that there is no standard message format used to generate display electronic information and electronic commerce information that is useable on a wide variety of wireless mobile electronic devices.

Another problem is that it is difficult to broadcast electronic content and commerce information in a format that is useable by a wide variety of wireless mobile devices. There have been attempts to solve some of the problems associated with broadcasting information to mobile devices in a generic format. See for example, U.S. Pat. No. 5,636,245, to Ernst, et al., entitled "Location Based Selective Distribution of Generally Broadcast Information." However, such systems require specialized hardware and software and still do not overcome all of the problems associated with broadcasting information to wireless mobile devices that are location aware.

This it is desirable to provide a network-independent location-aware protocol, interfaces, and a method and system for using the protocol and interfaces for location-aware wireless mobile devices. The protocol and interfaces should be usable over a large variety of wireless transport networks and on a large variety of location-aware wireless mobile devices.

SUMMARY OF THE INVENTION

In accordance with preferred embodiments of the present invention, some of the problems associated mobile devices are overcome. A method and system for location-aware wireless mobile devices including mobile user network interfaces and protocol is presented.

One aspect of the invention includes a network-independent location-aware network protocol for communicating with location-aware wireless mobile devices. Another aspect of the invention includes a method for providing alert information to a location-aware wireless mobile device. Another aspect of the invention includes a method for locating and providing alert information to a location-aware wireless mobile device.

The method, system, interfaces and protocol may help improve usability of wireless mobile devices by allowing the wireless mobile devices to be location-aware.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 7 is a block diagram illustrating a layout for a location identifier;

FIG. 8 is a block diagram illustrating a transport network location-aware interface for a transport network;

FIG. 9 is a block diagram illustrating a mobile device location-aware interface for a location-aware wireless mobile device;

FIG. 10 is flow diagram illustrating a method for providing alert information to a location-aware wireless mobile device;

FIGS. 15A and 15B are flow diagram illustrating a method for locating and providing alert information to a location-aware wireless mobile device;

DETAILED DESCRIPTION OF PREFERRED EMBODIMENTS

Exemplary Location-Aware Network System

Figure 1:
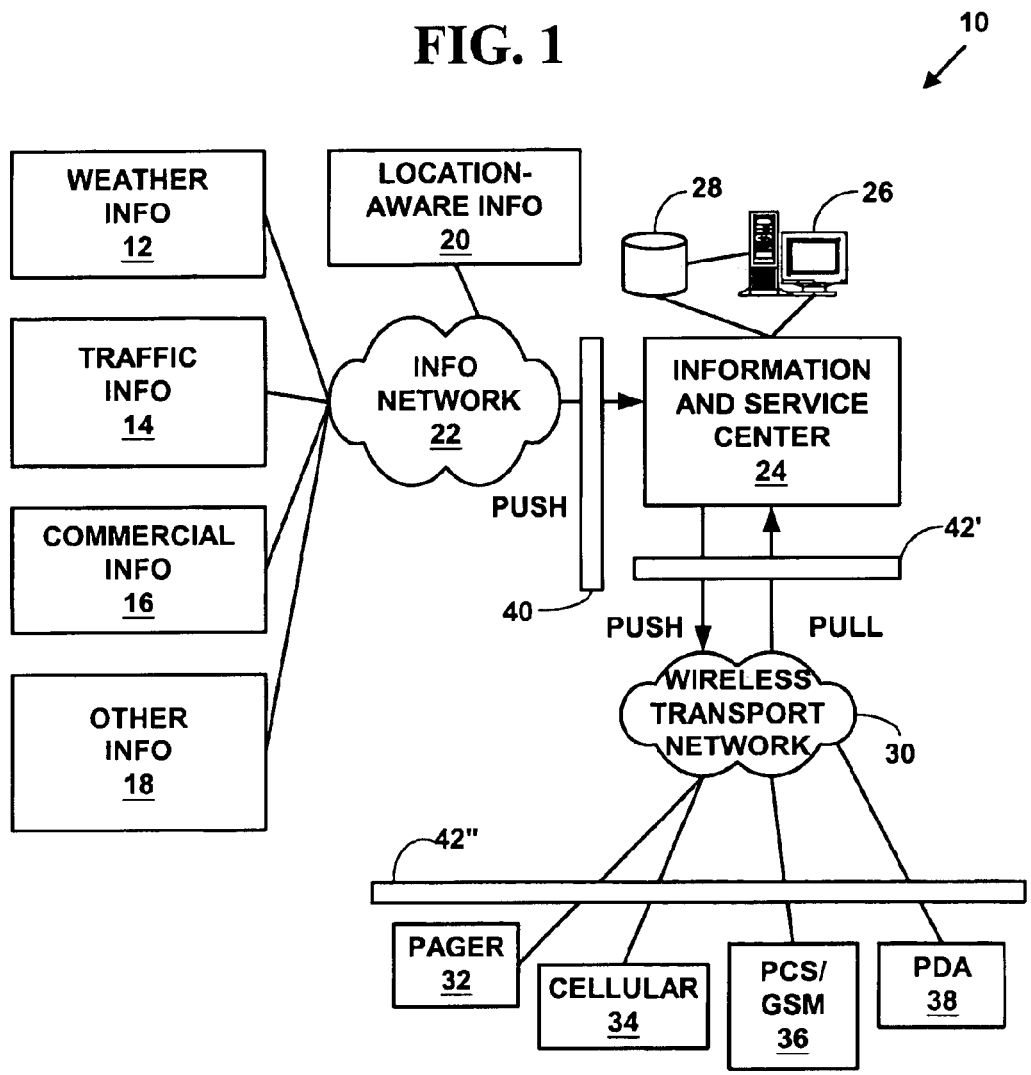
FIG. 1 is a block diagram that illustrates an exemplary location-aware network system.

FIG. 1 is a block diagram that illustrates an exemplary location-aware network system 10. The exemplary location-aware network system 10 includes plural information sources 12, 14, 16, 18, 20 (five of which are illustrated), an information network 22, an information and service center ("ISC") 24 with plural servers 26 and one or more associated databases 28 (only one of each is illustrated), a wireless transport network 30, (only one of which is illustrated) and plural wireless mobile devices 32, 34, 36, 38 (four of which are illustrated). The exemplary location-aware network system 10 further includes an interface 40 between the information network 22 and the ISC 24 and an interface 42 with a first interface component 42' between the ISC 24 and the wireless transport network 30 and a second interface component 42" between the wireless transport network 30 and the plural wireless mobile devices 32, 34, 36, 38. The exemplary location-aware network system 10 can also be used with wired devices and fixed (i.e., non-mobile) wireless devices (not illustrated in FIG. 1) and is not limited to mobile wireless devices. The present invention is also not limited to the components described and more or fewer, or other types of components can also be used.

In one embodiment of the present invention, the plural information sources include a weather information source 12, a traffic information source 14, a commercial information source 16 including electronic commerce ("e-commerce"), mobile commerce ("m-commerce), etc., other services information sources 18 and an information source including current geographic locations of mobile devices 20. The information network 22 includes a wireless radio frequency ("RF") network, a satellite network, the Internet, an intranet or other information network including point-to-point, point-to-multi-point and other types of wireless or wired information or communication networks.

The ISC 24 includes plural servers 26 to serve electronic content to wireless mobile devices including Hyper Text Markup Language ("HTML"), eXtensible Markup Language ("XML"), Wireless Markup Language ("WML"), Handheld Device Markup Language ("HDML"), Java, and other types and formats of electronic content. The plural servers 26 include associated databases 28 to store electronic content, electronic templates and information obtained from the plural information sources 12, 14, 16, 18, 20. The ISC 24 is in communications with the information network 22, as well as the wireless transport network 30 with plural types of communications protocols (e.g., RF, Medium Access Control ("MAC"), Internet Protocol ("IP"), Wireless Application Protocol ("WAP"), etc.). In one embodiment the plural databases 28 are SQL databases or other types of relational databases used for event processing, forwarding, updating and tracking information.

In one embodiment of the present invention, information is "pushed" from the plural information sources 12, 14, 16, 18, 20 to the ISC 24 via interface 40. Pre-determined types and amounts of information are stored in the plural databases 28 associated with the plural servers 26. The stored information is served by the plural servers 26 and is "pushed" to the plural wireless mobile devices 32, 34, 36, 38 via the wireless transport network 30 and interfaces 42' and 42". Information, is also "pulled" from the plural wireless mobile devices 32, 34, 36, 38, back to the ISC 24 via the wireless transport network 30 and interfaces 42' and 42".

Figure 2:
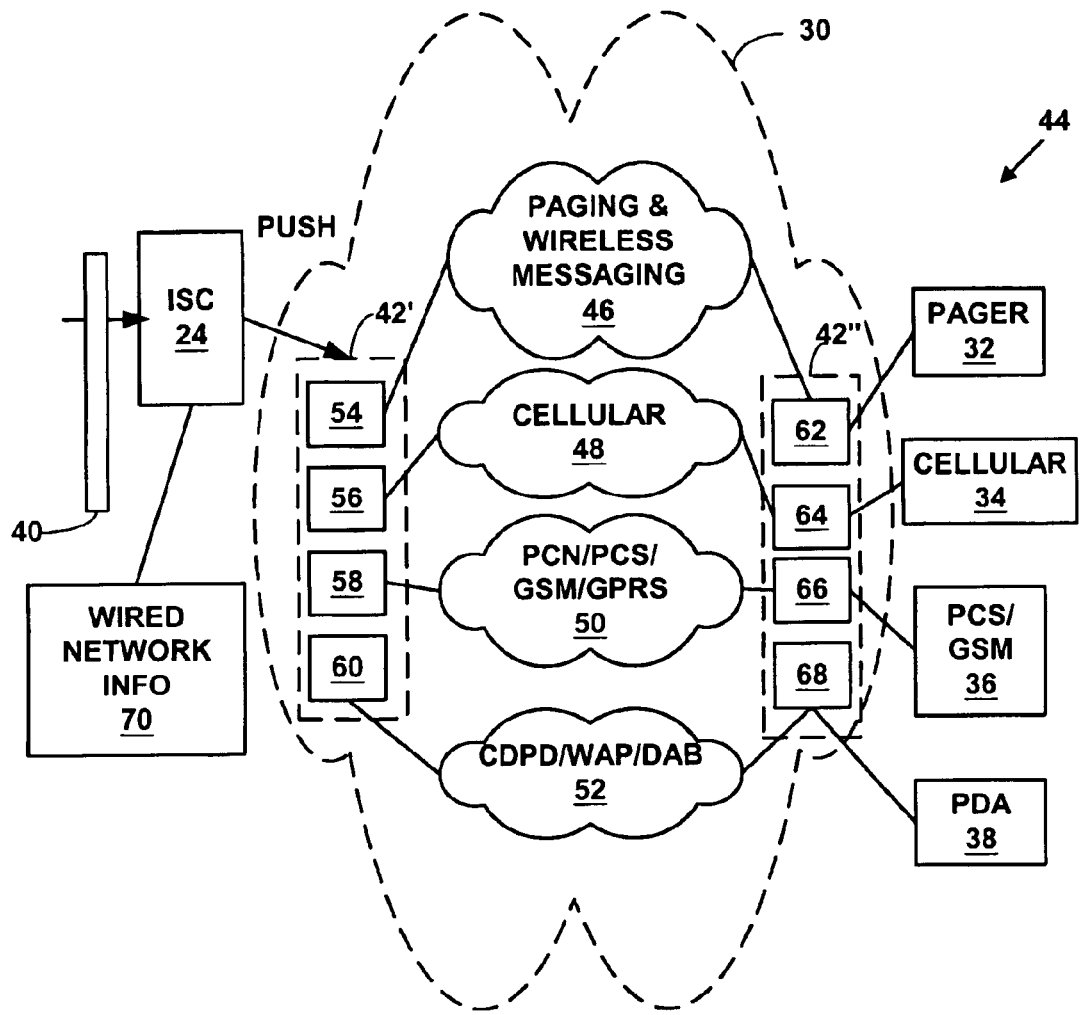
FIG. 2 is a block diagram illustrating additional details of the wireless transport network of the exemplary location-aware network system of FIG. 1.

FIG. 2 is a block diagram 44 illustrating further details of the wireless transport network 30 of the exemplary location-aware network system 10 of FIG. 1. The wireless transport network 30 includes, but is not limited to, a paging and wireless messaging network 46, a cellular telephone network 48, a Packet Cellular Network ("PCN") or Global System for Mobile Communications, ("GSM"), Generic Packet Radio Services ("GPRS"), or network/Personal Communications Services network ("PCS") 50, a Cellular Digital Packet Data ("CDPD") or Wireless Application Protocol ("SWAP") or Digital Audio Broadcasting ("DAB") network 52, or Bluetooth, 802.11b, or other type of wireless transport networks.

The wireless transport network 30 includes, but is not limited to Code Division Multiple Access ("CDMA"), Time Division Multiple Access ("TDMA"), or other wireless technologies.

As is known in the art, PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operates in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

As is known in the art, GSM is another type of digital wireless technology widely used throughout Europe, in Australia, India, Africa, Asia, and the Middle East. GSM is currently not widely used in the United States, but its use is growing. GSM is a wireless platform based on TDMA to digitize data. GSM includes not only telephony and Short Message Services ("SMS") but also voice mail, call forwarding, fax, caller ID, Internet access, and e-mail. As is known in the art, SMS is type of communications service that enables a user to allow private message communications with another user. GSM typically operates at three frequency ranges; 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

As is known in the art, GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

As is known in the art, CDPD is a wireless standard providing two-way, 19.2-Kbps or higher packet data transmission over existing cellular telephone channels. As is known in the art, a Packet Cellular Network ("PCN") includes various types of packetized cellular data.

As is known in the art, an 802.11b is a short-range wireless network. The IEEE 802.11b standard defines wireless interfaces that provide up to 11 Mbps wireless data transmission to and from wireless devices over short ranges.

As is known in the art, Bluetooth is a short-range (e.g., about 10 meters) radio frequency technology aimed at simplifying communications among network devices and between network devices. Bluetooth wireless technology supports both short-range point-to-point and point-to-multipoint connections. In another embodiment of the present invention, the Bluetooth or 802.11b transport networks can be replaced with virtually any other short-range or long-range radio interface transport networks.

The wireless transport network 30 can also include digital audio broadcasting ("DAB"). As is known in the art, DAB is compact disk ("CD") quality audio also known as MUSICAM including ISO/IEC 11172-3 (MPEG-1 Audio Layer II) and ISO/IEC 13818-3 (MPEG-2 Audio Layer II). DAB supports mono, stereo and dual-channel bilingual programs. It supports different encoded bit-rate options including 8, 16, 24, 32, 40, 48, 56, 64, 80, 96, 112, 128, 144, 160 or 192 kbit/s per channel.

DAB allows Programme Associated Data ("PAD") with a variable capacity of a minimum of 667 bits-per-second ("bps") up to 65 kbits/s. DAB can be used for independent data service channels in the form of a continuous stream segmented into 24 milli-second ("ms") logical frames with a data rate of N×8 kbits/s (N×32 kbits/s for some code rates). Typical DAB data services include a traffic message channel, correction data for Digital GPS ("DGPS"), paging and electronic newspaper features. A DAB system may be used to suggest routes to drivers.

The location-aware wireless mobile devices can be in communications with any of the transport networks described over a piconet or scatternet. As is known in the art, a "piconet" is a network in which "slave" devices can be set to communicate with a "master" radio controller in one device such as a gateway. Piconets are typically limited to a certain range and vicinity in which wireless devices must be present to operate (e.g., a few feet up to few miles away from the master radio controller). Several "piconets" can be established and linked together in "scatternets."

In one embodiment of the present invention, each of the wireless transport networks 46, 48, 50, 52 include a service provider interface ("SPI") 54, 56, 58, 60, respectively to the transport networks 46, 48, 50, 52. Each of these transport networks 46, 48, 50, 52 also include plural Mobile User Network Message Interfaces ("MUNMI") 62, 64, 66, 68 to the plural wireless mobile devices 32, 34, 36, 38. The SPI and the MUNMI together are used as a transport network location-aware interface as is described below (FIG. 8). In another embodiment of the present invention, less than each of the wireless transport networks 46, 48, 50, 52 include a SPI or a MUNMI interface.

FIG. 2 also illustrates the ISC 24 includes a wired network interface 70 for communications with a wired network. The wired network interface 70 connects the ISC 24 to wired networks such as Plain Old Telephone Service ("POTS"), Asymmetric Digital Subscriber Line ("ADSL"), packet networks such as Internet Protocol ("IP") network or other types of wired networks. The wired network interface 70 can also connect the ISL 24 to the information network 22.

As is known in the art, ADSL is a communications technology that transmits an asymmetric data stream over a conventional twisted pair of copper telephone wires. An ADSL typically transmits a larger data rate downstream to a subscriber from a telephony switching office than from a subscriber back to the telephony switching office. ADSLs typically transmit about 1.5 Mega bits-per-second ("Mbps") to about 9 Mbps downstream to a subscriber, and about 16 kilo-bps ("kbps") to 640 kbps upstream back to a telephony switching office. The wired network 70 may also include one or more of the following interfaces: ADSL, symmetric DSL ("SDSL"), high-bit-rate DSL ("HDSL") or very-high-bit-rate ("VDSL").

The wired network interface 70 may also include connections to higher-bandwidth wired networks such as Asynchronous Transport Mode ("ATM"), Optical transmission, Integrated Services Digital Network, ("ISDN"), Frame Relay or other higher-bandwidth wired networks.

The plural wireless mobile devices 32, 34, 36, 38 include one or two way pagers, cellular, mobile or other phones, with or without one or two way paging capabilities, PCS/GSM phones with or without one or two-way paging capabilities, PDAs such as the Palm Pilot, by Palm Inc. of Santa Clara, Calif., the Handspring, by Handspring, Inc. of Mountain View, Calif., Ipaq, by Compaq Computer Corporation of Houston, Tex., and other types of PDAs,"), Generic Packet Radio Services ("GPRS") devices, Global Positioning System ("GPS") and GPS map devices, Digital GPS ("DGPS") devices, Wireless Application Protocol ("WAP") mobile or fixed devices, Bluetooth, 802.11b, or other types of wireless mobile devices.

Preferred embodiments of the present invention include network devices that are compliant with all or part of standards proposed by the Institute of Electrical and Electronic Engineers ("IEEE"), International Telecommunications Union-Telecommunication Standardization Sector ("ITU"), Internet Engineering Task Force ("IETF"), American National Standard Institute ("ANSI"), Wireless Application Protocol ("WAP") Forum, Bluetooth Forum, or the ADSL Forum.

However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The ANSI standards can be found at the URL "www.ansi.org." Bluetooth Forum documents can be found at the URL "www.bluetooth.com." WAP Forum documents can be found at the URL "www.wapforum.org." ADSL Forum documents can be found at the URL "www.adsl.com."

An operating environment for devices and interfaces used for the present invention include a processing system with one or more high speed Central Processing Unit(s) ("CPU")

and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Network-Independent Location-Aware Protocol

Figure 3:
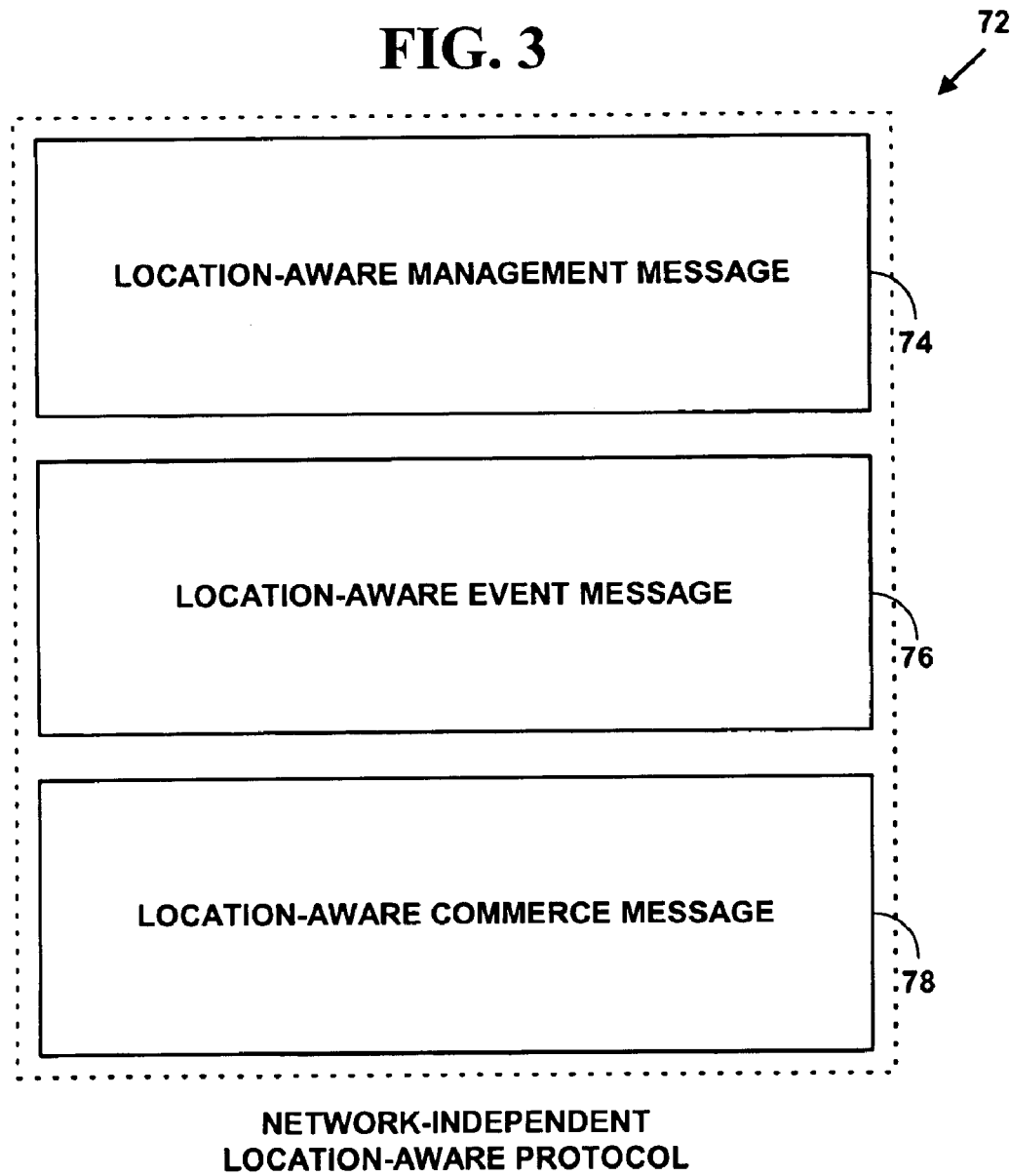
FIG. 3 is a block diagram illustrating a network-independent location-aware network protocol for communicating with location-aware wireless mobile devices.

FIG. 3 is a block diagram illustrating a network-independent location-aware protocol 72 for communicating with location-aware wireless mobile devices. The protocol 72 is "network-independent" to support and deliver location-aware services over virtually any wireless or wired transport network transparently regardless of the protocols being used on a transport network. The protocol 72 is "location-aware" and is used to send and receive current geographic locations of plural wireless mobile devices. The geographic locations may include, but are not limited to, a longitude and latitude, metes and bounds, a street address, a location on a street or highway, or other geographic location designator. The protocol 72 is also service transparent to allow a wide variety of location-aware wireless mobile devices to be reached via a standard interface. The protocol 72 is efficient, expandable, can be used redundantly for fault tolerance and allows Authorization, Authentication and Accounting ("AAA") features. The protocol 72 is also used to provide "information-in-place." The ISC 24 provides mobile users with location-aware wireless mobile devices specific information-in-place in such places as airports, shopping malls, university campuses, and other indoor (e.g., sports arena, museum, etc.) or other outdoor facilities (e.g., street, sidewalk, etc.).

The location-aware protocol 72 includes a location-aware management message 74, a location-aware event message 76 and a location-aware commerce message 78. The network-independent location-aware protocol messages 74, 76, 78 can be simultaneously transmitted over plural different types of transport networks for plural different types of location-aware wireless mobile devices in plural different locations in a specific geographic area. However, the present invention is not limited to this embodiment and more, fewer or other location-aware messages can also be used for the network-independent location-aware protocol 72.

The location-aware management message 74 includes a location-aware message for sending and receiving management messages to and from location-aware wireless mobile devices. The location-aware event message 76 includes a location-aware message for sending and receiving emergency or non-emergency event messages to and from location-aware wireless mobile devices. The location-aware commerce message 78 includes a message for sending and receiving commerce messages to and from location-aware wireless mobile devices.

In one embodiment of the present invention, the location-aware management message 74 includes plural management message tags to request a location identifier of a location-aware wireless mobile device, send a location identifier to a location-aware wireless mobile device or send an acknowledgement to a location-aware wireless mobile device. The location-aware event message 76 includes plural event message tags for emergency or non-emergency event information generated for location-aware wireless mobile devices in a specific geographic area. The location-aware commerce message 78 includes plural commerce message tags for commercial information including e-commerce, m-commerce and other types of electronic commercial transactions. However, the present invention is not limited to such an embodiment and more, fewer or other types of location-aware message functionality can also be used for the location-aware messages.

The network-independent location-aware location aware protocol 72 allows various types of information from various types of information sources to be fused into a network-independent location-aware format.

Figure 4:
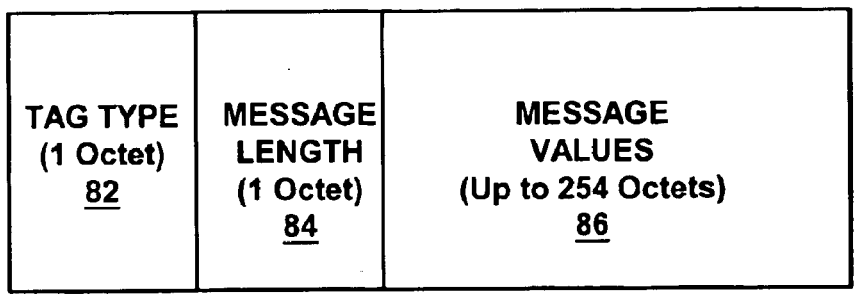
FIG. 4 is a block diagram illustrating an exemplary pre-determined location-aware message format.

FIG. 4 is a block diagram illustrating an exemplary pre-determined location-aware message format layout 80 for messages from the network-independent location-aware network protocol 72. In one embodiment of the present invention, the pre-determined location-aware message format 80 includes plural fields in Type-Length-Value ("TLV") format. However, the present invention is not limited to such an embodiment and other formats can also be used. The pre-determined location-aware message format layout 80 of FIG. 4 includes first field for a tag type 82, a second field for a message length 84 and a third field for a message value 86.

In one embodiment of the present invention, the tag type field 82 is one octet (i.e., eight-bits or one-byte) and includes operation maintenance and administration event tags, emergency event tags, non-emergency event tags, commerce tags including e-commerce or m-commerce tags or other types of tags. The message length field 84 is one octet and includes a total length (e.g., in octets, etc.) of a location-aware message. The message value field 86 is up to 254 octets longs and includes a user identifier, a message identifier, an event type identifier, a location identifier for a location-aware wireless mobile device, or message data for a location-aware wireless mobile device. The message data may include text, audio, video, graphical or other type of message information. However, the present invention is not limited to this embodiment and other sizes and fields can be used for the location-aware message format layout 80.

Table 1 illustrates exemplary tags used for the tag type field 82 (FIG. 4) for the location-aware message format layout 80. However, the present invention is not limited to the exemplary values in Table 1 and more, fewer or other tag types can also be used, The tag types are indicated in hexidecimal number format (i.e., 0xnumber format). However, the present invention is not limited to hexidecimal tag format and other formats can also be used.

TABLE 1

| Tag Type 82 | Tag Type Description (1 octet) |
|---|---|
| 0x00–0x1F | Operations, Maintenance and Administration ("OM&A") |
| 0x20–0x3F | Event category: Weather |
| 0x40–0x5F | Event category: Traffic |
| 0x60–0x7F | Event category: Emergency |
| 0x80–0x9F | Commerce (General/Commercial, e-commerce, m-commerce, etc.) |
| 0xA0–0xFF | Reserved for future use. |

Table 2 illustrates exemplary information used for the message value field 86 (FIG. 4). However, the present invention is not limited to the exemplary information in Table 2 and more, fewer or other types and sizes of information can also be used.

TABLE 2

| Message value 86 identifier | Size (254 octets) |
|---|---|
| User Identifier | 32 octets |
| Message Identifier | 8 octets |
| Event Type | 2 octets |
| Location | 8 octets |
| Message Data | Up to 204 octets |

Table 3 illustrates exemplary information used for an OM&A tag illustrated in Table 1. However, the present invention is not limited to the exemplary information in

TABLE 3

| OM&A Tag Type | Value Length (Octets) | Value | Direction |
|---|---|---|---|
| 0000 0000 unused | N/A | N/A | N/A |
| 0000 0001 GET location | 32 | User ID | Network → Mobile Device |
| 0000 0010 PUT location | 40 | User ID + Location | Mobile Device → Network |
| 0000 0011 ACK | 48 | User ID + Message ID + Location | Mobile Device → Network |
| 0000 xxxx Future Use | N/A | N/A | N/A |

Table 4 illustrates exemplary information used for a Weather tag illustrated in Table 1. However, the present invention is not limited to the exemplary information in Table 4 and more, fewer or other information can also be used.

TABLE 4

| Weather Tag Type | Value Length (Octets) | Value | Direction |
|---|---|---|---|
| 0010 0000 Cancelled | 4 | Message ID | Network → Mobile Device |
| 0010 0001 Advisory | 14 <= N < 254 | Message ID + Event Type + Location + Message | Network → Mobile Device |
| 0010 0010 Watch | 14 <= N < 254 | Message ID + Event Type + Location + Message | Network → Mobile Device |
| 0010 0011 Warning | 14 <= N < 254 | Message ID + Event Type + Location + Message | Network → Mobile Device |
| 0010 0100 Severe | 14 <= N < 254 | Message ID + Event Type + Location + Message | Network → Mobile Device |
| 0010 xxxx Future Use | N/A | N/A | N/A |

Table 5 illustrates exemplary information used for a Traffic tag illustrated in Table 1. However, the present invention is not limited to the exemplary information in Table 5 and more, fewer or other information can also be used.

TABLE 5

| Traffic Tag Type | Value Length (Octets) | Value | Direction |
|---|---|---|---|
| 0100 0000 Cancelled | 4 | Message ID | Network → Mobile Device |
| 0100 0001 Advisory | 14 <= N < 254 | Message ID + Event Type + Location + Message | Network → Mobile Device |
| 0100 0010 Watch | 14 <= N < 254 | Message ID + Event Type + Location + Message | Network → Mobile Device |
| 0100 0011 Warning | 14 <= N < 254 | Message ID + Event Type + Location + Message | Network → Mobile Device |
| 0100 0100 Report | Up to 254 | Message ID + Event Type + Location + Message | Mobile Device → Network |

This action is reserved for public safety personal, such as traffic police and emergency crews who are authorized to report traffic related instances on the scene. Another tag may be used to allow individual users to report traffic problems TABLE 5-continued

| Traffic Tag Type | Value Length (Octets) | Value | Direction |
|---|---|---|---|
|  |  |  | that are verified. The User ID of authorized reporters will be validated by the ISC 24 before accepting such traffic information. |
| 0010 xxxx Future Use | N/A | N/A | N/A |

Table 6 illustrates exemplary information used for an Emergency tag illustrated in Table 1. However, the present invention is not limited to the exemplary information in Table 6 and more, fewer or other information can also be used.

TABLE 6

| Emergency Type Tag | Value Length | Value | Direction |
|---|---|---|---|
| 0110 0000 E911 | 4 <= N < 256 | User ID + Location + Message | Mobile Device → Network |

The Federal Communications Commission ("FCC") is currently promoting public safety for wireless telephones via E911 to connect to emergency services, similar to the way 911 calls are made are made on wired phones. The E911 tag can be used to initiate an emergency call from a wireless location-aware mobile device.

Table 7 illustrates exemplary information used for a Commerce tag illustrated in Table 1. However, the present invention is not limited to the exemplary information in Table 7 and more, fewer or other information can also be used.

TABLE 7

| Commerce Type Tag | Value Length | Value | Direction |
|---|---|---|---|
| 1000 000 Plain Text Message | 4 <= N < 256 | Message ID + Message | Network → Mobile Device |
| 1000 0001 E-Mail | 4 <= N < 256 | Message ID + Message | Network → Mobile Device |
| 1000 0010 E-commerce | 4 <= N < 256 | Message ID + Message | Network → Mobile Device |
| 1000 0011 M-commerce | 4 <= N < 256 | Message ID + Message | Network → Mobile Device |
| 1000 xxxx Future Use | N/A | N/A | N/A |

Figure 5:
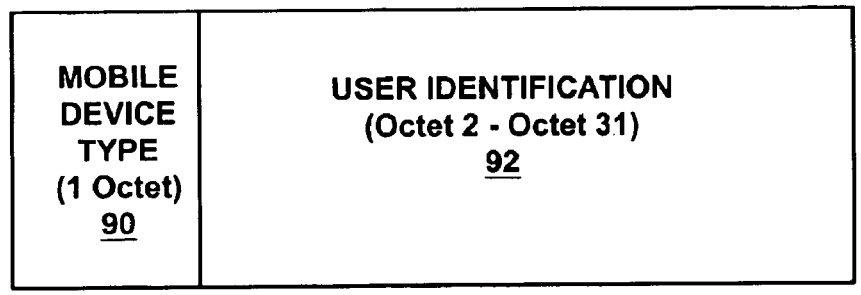
FIG. 5 is a block diagram illustrating a layout for a user identifier.

FIG. 5 is a block diagram illustrating a layout for a user identifier 88 (Tables 3 and 6). The user identifier 88 includes a first field 90 for a mobile device type and a second field 92 for a user identification number. In one embodiment of the present invention, the first field 90 is a one octet field to identify a type of mobile network device (e.g., 32, 34, 36, 38) and the second field 92 includes up to 31 octets to store a user identification number for a total of 32 octets. However, the present invention is not limited to such an embodiment and more, fewer or different fields or field sizes can also be used.

Table 8 illustrates mobile device type tags used in the first field 90 of the user identifier layout 88. However, the present invention is not limited to the exemplary information in Table 8 and more, fewer or other information can also be used.

TABLE 8

| Mobile Device Type 90 Tag | Description |
|---|---|
| 0000 0001 | One-way pager |
| 0000 0010 | Two-way pager |
| 0000 0011 | Cellular device |
| 0000 0100 | PCS device |
| 0000 0101 | GSM - 900 MHz |
| 0000 0110 | GSM - 1800 MHz |
| 0000 0111 | GSM - 1900 MHz |
| 0000 1000 | CDPD |
| 0000 1001 | Packet Radio |
| 0000 1010 | PDA |
| 0000 xxxx | Future Use |

Figure 6:
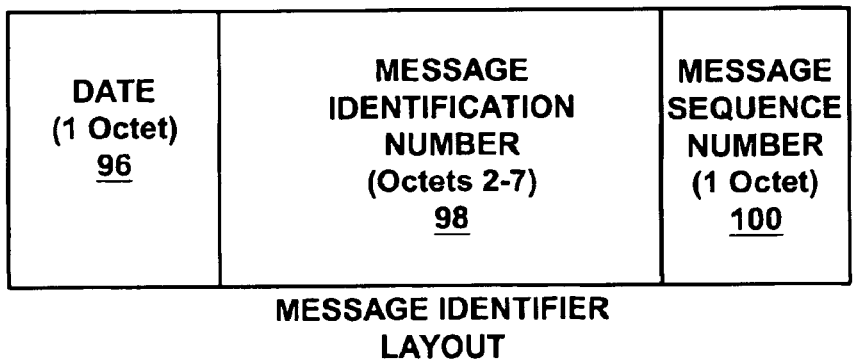
FIG. 6 is block diagram illustrating a layout for a message identifier.

FIG. 6 is a block diagram illustrating a layout for a message identifier 94 (Tables 2, 3, 4, 7). The message identifier layout 94 includes a first field 96 to store a date, a second field 98 to store a message identifier, and a third field 100 for a message sequence number. In one embodiment of the present invention, the first field 96 is one octet, the second field 98 is six octets (i.e., octets 2–7) and the third field 100 is one octet for a total of eight octets. However, the present invention is not limited to such an embodiment and more, fewer or different number and size of fields can also be used.

Table 9 illustrates Weather event type tags (Table 4). However, the present invention is not limited to such an embodiment and more, fewer or different weather event type tags can also be used.

TABLE 9

| Weather Event Type Tag | Description |
|---|---|
| 0000 0000 0000 0001 (0x0001) | Tornado |
| 0000 0000 0000 0010 (0x0002) | Hurricane (Typhoon) |
| 0000 0000 0000 0011 (0x0003) | Severe Thunder Storm |
| 0000 0000 0000 0100 (0x0004) | Flash Flood |
| 0000 0000 0000 0101 (0x0005) | Flood |
| 0000 0000 0000 0110 (0x0006) | Winter Storm |
| 0000 0000 0000 1111 (0x0007) | Specific Marine |
| 0000 0000 0000 1000 (0x0008) | Non-Precipitation |
| 0000 0000 0000 1001 (0x0009) | Severe Weather |
| 0000 0000 0000 1010 (0x000A) | Tsunami/Tide |
| xxx xxxx xxxx xxxx (Future Use) | N/A |

Table 10 illustrates Traffic event type tags (Table 5). However, the present invention is not limited to such an embodiment and more, fewer or different weather event type tags can also be used.

TABLE 10

| Traffic Event Type Tag | Description |
|---|---|
| 0000 0000 0000 0001 (0x0001) | Accident |
| 0000 0000 0000 0010 (0x0002) | Traffic Jam |
| 0000 0000 0000 0011 (0x0003) | Construction |
| 0000 0000 0000 0100 (0x0004) | Road Closed |
| 0000 0000 0000 0101 (0x0005) | Icy Condition |
| 0000 0000 0000 0110 (0x0006) | Fog/Low Visibility |
| xxx xxxx xxxx xxxx (Future Use) | N/A |

FIG. 7 is a block diagram illustrating a layout for a location identifier 102 (Tables 2 and 3). The location identifier layout 102 includes a first field 104 for a longitude and a second field 106 for a latitude. In one embodiment of the present invention, the first field 104 is four octets and the second field 106 is four octets for a total of eight octets. However, the present invention is not limited to such an embodiment and more, fewer or different number and size of fields can also be used. In addition, as was discussed above, a location identifier other than a longitude and latitude can also be used.

Network-Independent Location-Aware Protocol Interfaces

In one embodiment of the present invention, interface 40 includes an interface component for receiving information data in the form of data bits, data frames, data packets, etc. from the information network 22 via one or more protocols in use on the information network 22. The information data includes information from the plural information sources 12, 14, 16, 18, 20. The desired information from the plural information sources 12, 14, 16, 18, 20 is collected from the information data and passed to the ICS 24 for further processing.

As was discussed above, the wireless transport networks 46, 48, 50, 52 (FIG. 2) include plural interfaces 42 with two interface components 42' and 42" that are used to interface with the plural wireless location-aware mobile devices 32, 34, 36, 38.

FIG. 8 is a block diagram illustrating a transport network location-aware interface 108 for a transport network. The transport network location-aware interface 108 includes a first location-aware protocol interface component 110 in communications with a second location-aware protocol interface component 112. However, the present invention is not limited to such an embodiment and more, fewer or other interface components can also be used for the transport network location-aware interface.

In one embodiment of the present invention, the transport network location-aware interface 108 is a software interface included in devices on a transport network (e.g., RF controller, gateways, switches, routers, etc.). However, the present invention is not limited to such an embodiment and other embodiments (e.g., firmware, hardware, combinations thereof, etc.) can also be used.

In one embodiment of the present invention, the first location aware protocol interface component 110 and the second location-aware protocol interface component 110 are used on opposites sides of a transport network 46, 48, 50, 52 as is illustrated in FIG. 8 (e.g., at 42' and 42" respectively of FIG. 1). However, the present invention is not limited to such an embodiment and other embodiments can also be used.

The first location-aware protocol interface component 110 is used for receiving network-independent location-aware protocol messages from an information repository on a wireless transport network. The network-independent location-aware protocol messages are used to communicate with plural different types of location-aware wireless mobile devices in plural different locations in a specific geographic area.

In one embodiment of the present invention, the first location aware protocol interface component 110 includes SPI 54, 56, 58, 60 (FIG. 2) for receiving network-independent location-aware protocol messages 74, 76, 78 (FIG. 3) from the ISC 24 on a wireless transport network 46, 48, 50, 52. However, the present invention is not limited to such an embodiment and other embodiments can also be used for the first location aware protocol interface component 110.

The second location-aware protocol interface component 112 is used for sending transport information from the wireless transport network via one or more wireless transport protocols in use on the wireless transport network to the plural different types of location-aware wireless mobile devices in a plural different locations in a specific geographic area. The transport network information includes network-independent location-aware protocol messages used to communicate with plural different types of location-aware wireless mobile devices in plural different locations in a specific geographic area.

In one embodiment of the present invention, the second location-aware protocol interface component 112 includes transport MUNMI 62, 64, 66, 68 (FIG. 2) for receiving transport information from the transport networks 46, 48, 50, 52 and sending it to plural different types of location-aware wireless mobile devices 32, 34, 36, 38 in plural different locations in a specific geographic area.

In one embodiment of the present invention, the ISC 24 generates network-independent location-aware protocol messages 74, 76, 78 and sends them to one of the specific wireless transport networks 46, 48, 50, 52 for delivery to a location-aware wireless mobile devices 32, 34, 36, 38 in a specific geographic area. However, the present invention is not limited to such an embodiment and other embodiments can also be used for the second location-aware protocol interface component 112.

The network-independent location-aware protocol messages 74, 76, 78 arrive at the first location-aware interface component 110 and are included in specific transport network information such as data bits, data frames, data packets, etc. The specific transport network information is transported over the transport networks 46, 48, 50, 52 to the second location-aware interface component 112 for delivery to a desired location-aware wireless mobile device 32, 34, 36, 38 in a specific geographic area.

FIG. 9 is a block diagram illustrating a mobile device location-aware interface 114 for a location-aware wireless mobile device. The mobile device location-aware interface 114 includes a first location-aware wireless mobile device interface component 116 in communications with a second location-aware wireless mobile device interface component 118. However, the present invention is not limited to such an embodiment and more, fewer or other interface components can also be used.

In one embodiment of the present invention, the mobile device location-aware interface 114 is a software interface included in a location-aware mobile wireless device. However, the present invention is not limited to such an embodiment and other embodiments (e.g., firmware, hardware, combinations thereof, etc.) can also be used.

The first location-aware wireless mobile device interface component 116 is used for receiving transport network information on a location-aware wireless mobile device from a wireless transport network via one or more wireless transport protocols in use on the wireless transport network. The transport information includes one or more network-independent location-aware protocol messages used to communicate with plural different types of location-aware wireless mobile devices in a plural different locations in a specific geographic area.

In one embodiment of the present invention, the first location-aware wireless mobile device interface component 116 receives transport network information including one or more network-independent location-aware protocol messages 74, 76, 78. The first location-aware wireless mobile device component 116 strips the transport network information away leaving only the one or more network-independent location-aware protocol messages 74, 76, 78. However, the present invention is not limited to such an embodiment and other embodiments can also be used for the first location-aware wireless mobile device interface component 116.

The second location-aware wireless mobile device interface component 118 is used for generating device specific information on the location-aware wireless mobile device from the one or more network-independent location-aware protocol messages.

In one embodiment of the present invention, the second location-aware wireless mobile device interface component 118 interfaces with device drivers on the location-aware wireless mobile device 32, 34, 36, 38 to generate text, audio, video, graphic or other information in a device-specific format based on the content of the one or more network-independent location-aware protocol messages 74, 76, 78. However, the present invention is not limited to such an embodiment and other embodiments can also be used for the second location-aware wireless mobile device interface component 118.

Providing Alert Information to a Location-Aware Device

FIG. 10 is flow diagram illustrating a Method 120 for providing alert information to a location-aware wireless mobile device. At Step 122, alert information is accepted from plural information sources on an information repository. The information repository is in communications with the plural information sources via an information network. The alert information is generated from emergency or non-emergency events. The alert information includes information for emergency or non-emergency events for a specific geographic area. At Step 124, the accepted alert information is formatted into a network-independent location-aware protocol message. The network-independent location-aware protocol message can be sent to plural different types of location-aware mobile wireless network devices in communications with the plural different types of transport networks via a plural uniform mobile user network message interfaces associated with the plural different types of transport networks. At Step 126, additional information is optionally added to the network-independent location-aware protocol message based on the specific geographic area identified in the alert information. The additional information is collected from a plural databases associated with the information repository. At Step 128, the network-independent location-aware protocol message is forwarded to the plural different types of transport networks in communications with the plural different types of location-aware mobile network devices located in the specific geographic area identified by the alert information. The plural different types of transport networks forward the uniform mobile alert message to the plural different types of location-aware mobile network devices located in the specific geographic area identified by the alert information via the plural uniform mobile user network message interfaces associated with the plural different types of transport networks.

Method 120 is illustrated with for one embodiment of the present invention. However, the present invention is not limited to such a embodiment and other embodiments can also be used with Method 120.

At Step 122, alert information is accepted from plural information sources 12, 14, 16, 18, 20 on the ISC 24. The ISC 24 is in communications with the plural information sources via an information network 22. The alert information is generated from emergency or non-emergency events. The alert information includes information emergency or non-emergency events for a specific geographic area. The emergency alert information, includes, but is not limited to, OM&A messages, Weather events, Traffic events, E911 events, or other emergency alerts. The non-emergency alerts include, but are not limited to, OM&A messages, commerce messages for e-commerce and m-commerce and other non-emergency alerts.

Figure 11:
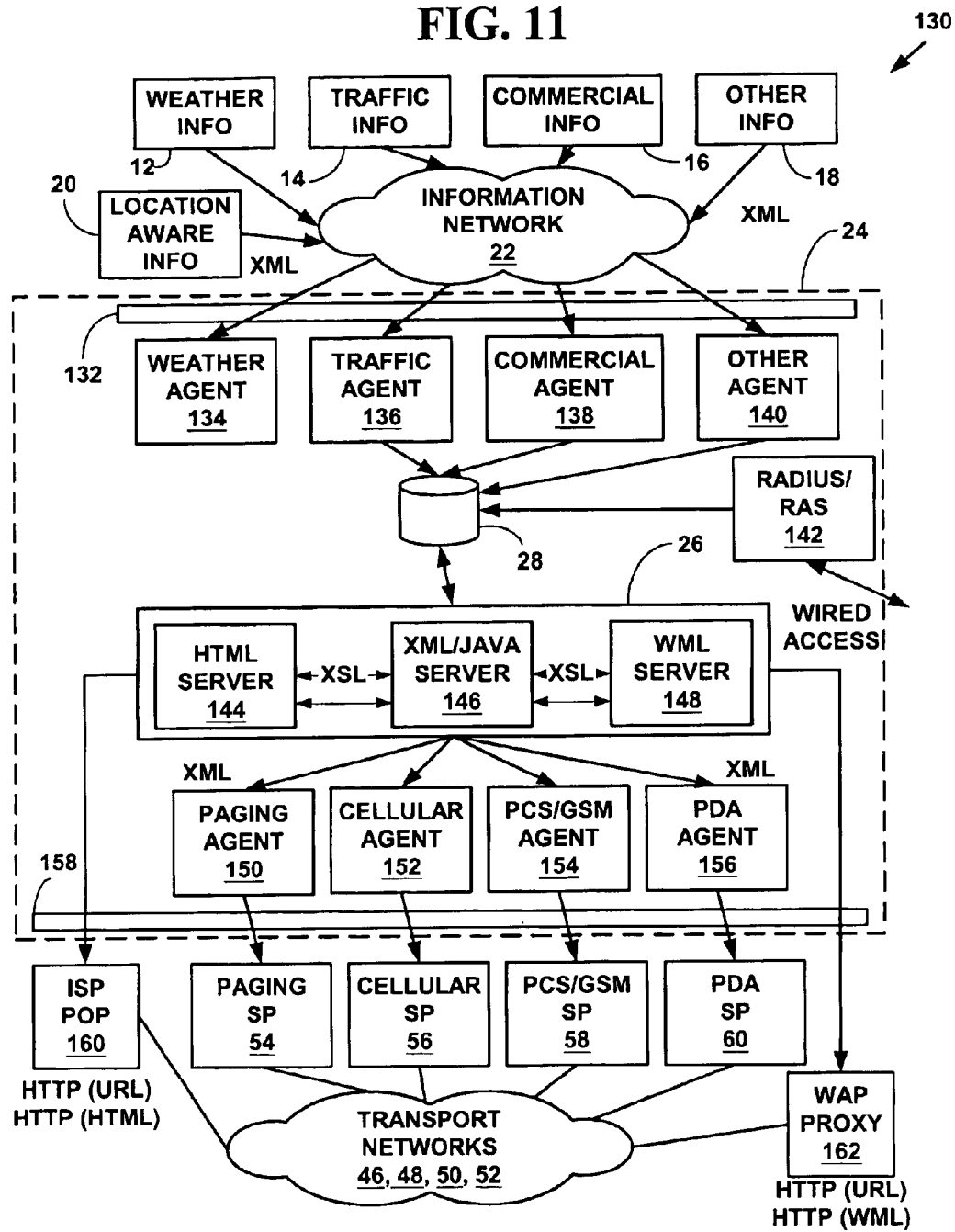
FIG. 11 is a block diagram illustrating additional details of an information and control center.

FIG. 11 is a block diagram 130 illustrating additional details of the ISC 24. The ISC 24 includes a first firewall 132 to protect the ISC 24 during communications with the information network 22. The ISC 24 also includes, but is not limited to, a Weather agent 134, a Traffic agent 136, a Commercial agent 138 and plural types of Other agents 140 (one of which is illustrated). These agents 134, 136, 138, 140 accept electronic information such as text, audio, video, graphics, and alert information from the plural information sources 12, 14, 16, 18, 20 respectively that is stored in the plural databases 28 associated with the ISC 24. The ISC 24 also includes a Remote Authentication Dial-In User Service ("RADIUS") agent or other Remote Access Server ("RAS") agent 142 for wired remote access.

The plural servers 26 associated with the ISC 24 include, but are not limited to, a Hyper-Text Markup Language ("HTML") server 144, an eXtensible Markup Language ("XML")/Java server 146, a Wireless Markup Language ("WML") server 148, or other types of servers (not illustrated). The plural servers 144, 146, 148 exchange eXtensible Style Language ("XSL") templates and other info. The XSL templates are a component of HTML, XML, WML, or other mark-up language documents. As is known in the art, XSL is a specification for separating style from content when creating HTML, XML, WML or other mark-up language documents. The plural servers 144, 146, 148 also exchange other types of information.

In one embodiment of the present invention, the alert information is accepted on the ISC 24 in XML format via the Hyper Text Transfer Protocol ("HTTP"). However, the present invention is not limited to such an embodiment and other formats and protocols can also be used to accept alert information.

The plural servers 144, 146, 148 exchange XML information with plural transport agents. The plural transport agents include, but are not limited to, a Paging agent 150, a Cellular agent 152, a PCS/GSM agent 154, a PDA agent 156 and plural other agents (not illustrated). The ISC 24 includes a second firewall 158 to protect the ISC during communications with the transport network 30 including plural transport networks 46, 48, 50, 52.

The HTML server 144 communicates via HTTP and other protocols in the Internet Protocol suite with an Internet Service Provider ("ISP") Point-of-Presence ("POP") 160. The WML server 148 communicates with the WAP Proxy 162 using WML or other wireless mark-up language.

The Paging agent 150 communicates with the Paging Service Point ("SP") 54 (FIG. 2). The Cellular agent 152 communicates with the Cellular SP 56. The PCS/GSM/GPRS agent 154 communicates with the PCS/GSM/GPRS SP 58. The PDA agent 156 communicates with a PDA SP 60. The plural other agents communicate with plural other SPs (not illustrated).

As was discussed above, the SPs 54, 56, 58, 60 are in communications with plural MUNMIs 62, 64, 66, 68 respectively as part of a transport network location-aware interface 108 (FIG. 6). The MUNMIs 62, 64, 66, 68 are in communications with plural mobile device location-aware interfaces 114 associated with the plural different types of location-aware wireless mobile devices 32, 34, 36, 38 (not illustrated in FIG. 11).

Returning to FIG. 10 at Step 124, the accepted alert information is formatted into a network-independent location-aware protocol message 74, 76, 78 depending on the type of alert information accepted. The network-independent location-aware protocol message 74, 76, 78 can be sent to plural different types of location-aware mobile wireless devices 32, 34, 36, 38 in communications with the plural different types of transport networks 46, 48, 50, 52 via a plural transport location-aware interfaces 108 associated with the plural different types of transport networks and via plural mobile device location-aware interfaces 114 associated with the plural different types of location-aware mobile wireless devices 32, 34, 36, 38.

At Step 126, additional information is optionally added to the network-independent location-aware protocol message 74, 76, 78 based on the specific geographic area identified in the alert information. The additional information is dynamically generated from plural databases 28 associated with the ISC 24.

For example, if the alert information was for an emergency weather event including a tornado warning, the additional information may include text describing the warning, a graphical map indicating the tornado warning area, predicated path of the tornado, etc., an audio warning signal, a current video of the local radar, etc. If the alert information was for an emergency traffic accident, the additional information may include text describing the accident location, a graphical map indicating the site of the accident and alternate routes in a selected color that could be used to avoid the accident scene. If the alert information was for a non-emergency m-commerce event for a pizza restaurant, the additional information may include an electronic coupon for the pizza restaurant for a specific geographical area. Those skilled in the art will realize virtually any type of additional information could be optionally added to the network-independent location-aware protocol message 74, 76, 78 at Step 126.

At Step 128, the network-independent location-aware protocol message 74, 76, 78 is forwarded to the plural different types of transport networks 46, 48, 50, 52, in communications with the plural different types of location-aware mobile network devices 32, 34, 36, 38 located in the specific geographic area identified by the alert information.

The plural different types of transport networks forward the network-independent location-aware protocol message 74, 76, 78 to the plural different types of location-aware mobile network devices 32, 34, 36, 38 located in the specific geographic area identified by the alert information via the plural transport network location-aware interfaces 108 associated with the plural different types of transport networks 46, 48, 50, 52 and via the plural mobile device location-aware interfaces 114 associated with the plural different types of location-aware wireless mobile device 32, 34, 36, 38.

Network-Independent Location-Aware Message Flows

Figure 12:
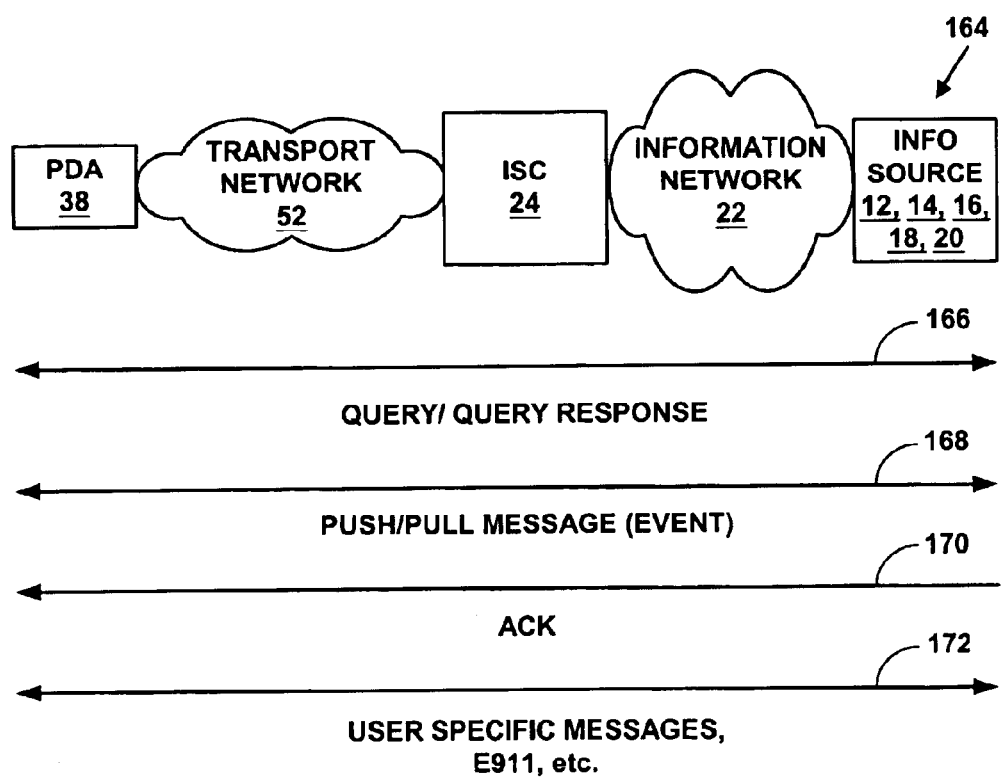
FIG. 12 is a block diagram illustrating exemplary message flows for the network-independent location-aware protocol of FIG. 3.

FIG. 12 is a block diagram illustrating exemplary message flows 164 for the network-independent location-aware protocol messages 74, 76, 78 (FIG. 3). The network-independent location-aware protocol messages 74, 76, 78 are sent between a location-aware wireless mobile device (e.g., PDA 38 ) and the ISC 24.

In this exemplary message flow, query/query response messages 166 include the OM&A GET location and PUT location messages (Table 3). The push/pull messages 168 include emergency event messages including weather events (Table 4) and traffic events (Table 5). The acknowledgement ("ACK") messages 170 include the OM&A ACK message (Table 3) and other ACK messages. The user specific messages 172 include E911 messages (Table 6), commerce messages (Table 7) and other user specific messages. However, the present invention is not limited to such an embodiment and other message flows including other messages can also be used.

Figure 13:
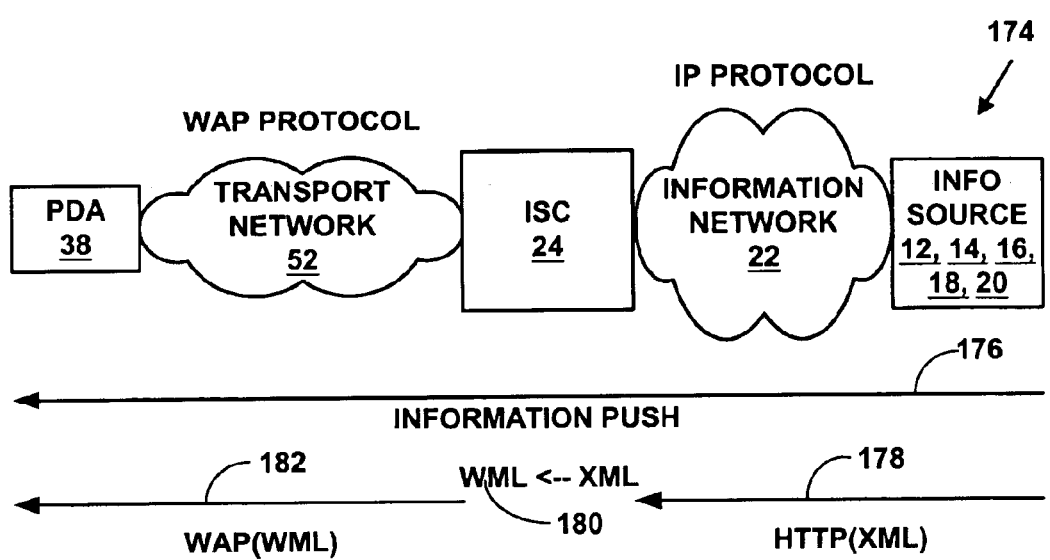
FIG. 13 is a block diagram illustrating exemplary alert information push flow for a WAP location-aware wireless mobile device.

FIG. 13 is a block diagram illustrating exemplary information push flow 174 for a WAP location-aware wireless mobile device. The information is pushed from one or more of the plural information sources 12, 14, 16, 18, 20 to the information network 22, to the ISC 24, to a WAP wireless transport networks 52 and to a WAP location-aware wireless mobile device (e.g., PDA 38). The push flow 174 is exemplary only and is illustrated only for a WAP device. However, the present invention is not limited to such an embodiment or WAP devices and information is pushed to other types of location-aware wireless mobile devices with other types of transport network protocols in a similar manner.

In this exemplary information push flow 174 one or more one of the plural information sources 12, 14, 16, 18, 20 creates an XML message with information and sends it via HTTP (e.g., over IP) via the information network 22 to ISC 24. The XML server 146 associated with the ISC 24 accepts the XML message and formats the alert information in the XML message into a network-independent location-aware protocol message 74, 76, 78 (Step 124 ). Additional information is optionally added to the network-independent location-aware protocol message (Step 126). The XML message including the network-independent location-aware message is translated into a WML message 180 including using XSL to translate style and sent to the WML server 148. The WML message 180 is sent 182 (e.g., forwarded Step 128) across a WAP transport network 52 to a WAP, location-aware wireless mobile device 38.

However, the present invention is not limited to such an embodiment. The XML message can be translated into WML in other ways and the present invention is not limited to translating XML into WML using XSL.

Figure 14:
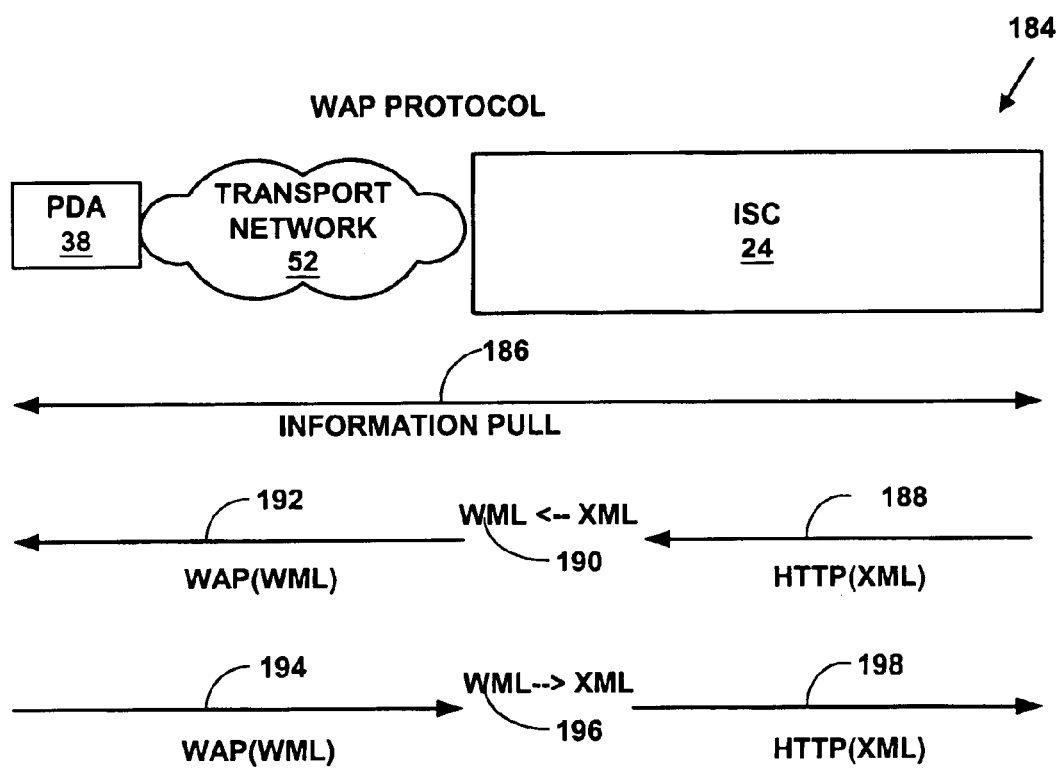
FIG. 14 is a block diagram illustrating exemplary alert information pull flow for a WAP location-aware wireless mobile device.

FIG. 14 is a block diagram 184 illustrating exemplary information pull flow 186 for a WAP location-aware wireless mobile device. The pull flow 186 is exemplary only and is illustrated only for a WAP device. However, the present invention is not limited to such an embodiment and information is pulled from other types of location-aware wireless mobile devices with other types of transport network protocols in a similar manner.

In this exemplary pull information flow 186, the ISC 24 creates an XML request for information (e.g., location information) 188 on the XML server 146. The XML request includes a network-independent location-aware protocol message 74, 76, 78. The XML message including the network-independent location-aware message is translated into a WML message 190 using XSL and sent to the WML server 148. The WML message 190 is sent 192 across a WAP transport network 52 to a WAP, location-aware wireless mobile device 38.

However, the present invention is not limited to such an embodiment. The WML message can be translated into XML in other ways and the present invention is not limited to translating WML into XML using XSL.

The WAP, location-aware wireless mobile device 38 creates a WML response including a network-independent location-aware protocol message 74, 76, 78 and sends 194 it to the ISC 24 via the WAP transport network 52. The WML server on the ISC 24 accepts the WML response message, translates 196 it into an XML messages using XSL sends 198 it to the XML server 146. The XML server 146 extracts the network-independent location-aware message from the XML message and stores the desired information (e.g., current location information) in one or more of the associated databases 28.

However, the present invention is not limited to such an embodiment. The XML message can be translated into WML in other ways and the present invention is not limited to translating XML into WML using XSL.

Locating and Providing Alert Information to a Location-Aware Device

Figure 15B:
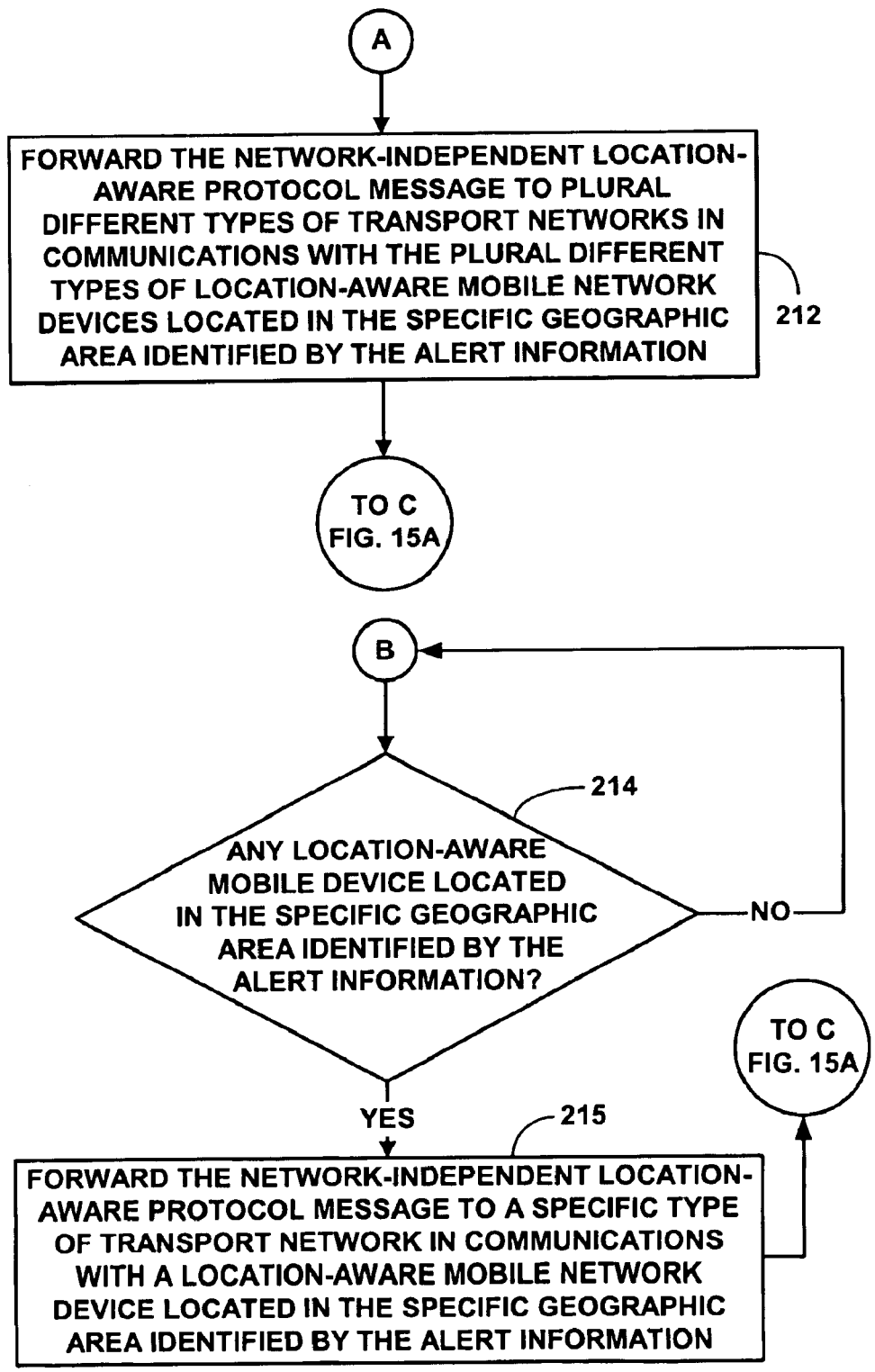

FIGS. 15A and 15B are flow diagram illustrating a Method 200 for locating and providing alert information to a location-aware device. At Step 202, location information is accepted from plural different types of location-aware wireless mobile devices on an information repository whenever a location of a location-aware wireless mobile device changes. The information repository is in communications with the plural information sources via an information network. At Step 204, alert information is accepted from plural information sources on the information repository. The alert information is generated from emergency or non-emergency events. The alert information includes information emergency or non-emergency events for a specific geographic area. At Step 206, the accepted alert information is formatted into a network-independent location-aware protocol message. The network-independent location-aware protocol message can be sent to the plural different types of location-aware mobile wireless network devices in communications with the plural different types of transport networks via a plural uniform mobile user network message interfaces associated with the plural different types of transport networks. At Step 208, additional information is optionally added to the network-independent location-aware protocol message based on the specific geographic area identified in the alert information. The additional information is collected from a plural databases associated with the information repository.

At Step 210, a test is conducted using the accepted location information to determine if any location-aware wireless mobile devices are currently located within the specific geographic area identified in the accepted altered information. If any location-aware wireless mobile devices are currently located within the specific geographic area identified in the accepted alter information, at Step 212 of FIG. 15B, the network-independent location-aware protocol message is forwarded to the plural different types of transport networks in communications with the plural different types of location-aware mobile network devices located in the specific geographic area identified by the alert information. The plural different types of transport networks forward the uniform mobile alert message to the plural different types of location-aware mobile network devices located in the specific geographic area identified by the alert information via the plural uniform mobile user network message interfaces associated with the plural different types of transport networks.

If any location-aware wireless mobile devices are not currently located within the specific geographic area identified in the accepted alter information, at Step 215, the accepted location information is periodically checked to determine whether additional location-aware mobile network devices are now currently located within the specific geographic area identified by the accepted alert information using the accepted location information. When a location-aware wireless mobile device is now currently located within the specific geographic area identified by the accepted alert information, at 215, the network-independent location-aware protocol message is forwarded to a specific transport network in communications with a location-aware mobile network device now located in the specific geographic area identified by the alert information. A time-out or other mechanism may be used to terminate Steps 212 and 215.

Method 200 is illustrated with for one embodiment of the present invention. However, the present invention is not limited to such a embodiment and other embodiments can also be used with Method 200.

In such an embodiment at Step 202 of FIG. 15A location information is accepted from plural different types of location-aware wireless mobile devices 32, 34, 36, 38 on the ISC 24 whenever a location of a location-aware wireless mobile device changes. In one embodiment of the present invention, the ISC 24 immediately accepts location information whenever a location of a location-aware wireless mobile device changes. In another embodiment of the present invention, the ISC 24 accepts location information in a manner other than immediately. In such an embodiment, additional buffers or servers may be used to buffer location information for the ISC 24 before acceptance. The ISC 24 is in communications with the plural different types of location-aware wireless mobile devices 32, 34, 36, 38, via plural different types of transport networks 46, 48, 50, 52.

In another embodiment of the present invention, the location information is accepted from a location-aware wireless mobile device by the ISC 24 and stored on the location information database 20 in communications with the information network 22. In such an embodiment, location information database 20 receives location information dynamically via the ISC 24 from the plural different types of location-aware wireless mobile devices 32, 34, 36, 38 via the plural different types of transport networks 46, 48, 50, 52 and/or via the information network 22.

At Step 204, alert information is accepted from plural information sources 12, 14, 16, 18, 20 on the ISC 24. The ISC 24 is in communications with the plural information sources 12, 14, 16, 18, 20 via the information network 22. The alert information is generated from emergency or non-emergency events. The alert information includes information emergency or non-emergency events for a specific geographic area.

At Step 206, the accepted alert information is formatted into a network-independent location-aware protocol message 74, 76, 78. The network-independent location-aware protocol message 74, 76, 78 can be sent to plural different types of location-aware mobile wireless network devices 32, 34, 36, 38 in communications with the plural different types of transport networks 46, 48, 50, 52 via a plural interfaces 108, 114 associated with the plural different types of transport networks.

At Step 208, additional information is optionally added to the network-independent location-aware protocol message 74, 76, 78 based on the specific geographic area identified in the alert information. The additional information is dynamically generated from the plural databases 28 associated with the ISC 24 as was described for Method 120 above.

At Step 210, a test is conducted using the accepted location information to determine if any location-aware wireless mobile devices 32, 34, 36, 38 are currently located within the specific geographic area identified in the accepted altered information. If any location-aware wireless mobile devices 32, 34, 36, 38 are currently located within the specific geographic area identified in the accepted alert information, at Step 212 of FIG. 15B the network-independent location-aware protocol message 74, 76, 78 is forwarded to one or more of the plural different types of transport networks 46, 48, 50, 52 in communications with the plural different types of location-aware mobile network devices 32, 34, 36, 38 located in the specific geographic area identified by the alert information. The plural different types of transport networks 46, 48, 50, 52 forward the uniform mobile alert message to the plural different types of location-aware mobile network devices 32, 34, 36, 38 located in the specific geographic area identified by the alert information via the transport network location-aware interfaces 108 associated with the plural different types of transport networks and the via the mobile device location-aware interfaces 114.

If any location-aware wireless mobile devices 32, 34, 36, 38 are not currently located within the specific geographic area identified in the accepted alter information, at Step 214, the accepted location information is periodically checked to determine whether additional location-aware mobile network devices 32, 34, 36, 38 are now currently located within the specific geographic area identified by the accepted alert information using the accepted location information. When a location-aware wireless mobile device 32, 34, 36, 38, is now currently located within the specific geographic area identified by the accepted alert information, at 215, the network-independent location-aware protocol message 74, 76, 78 is forwarded to a specific transport network in communications with a location-aware mobile network device now located in the specific geographic area identified by the alert information.

Other Exemplary Location-Aware Network Systems

Figure 16:
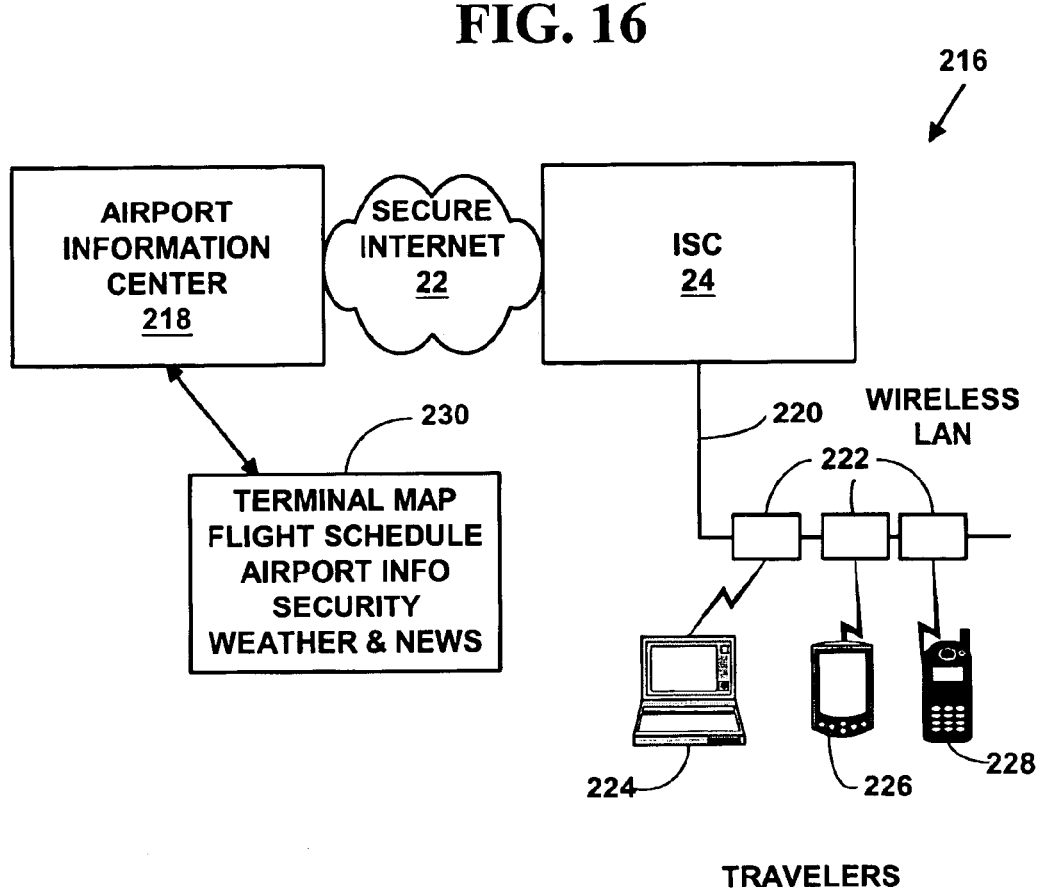
FIG. 16 is a block diagram illustrating an exemplary location-aware network system for an airport.

FIG. 16 is a block diagram illustrating an exemplary location-aware network system for an airport 216. The location-aware network system for an airport 216 includes an airport information center 218 a wireless LAN 220 with plural wireless access points 222 (three of which are illustrated), plural location-aware wireless mobile devices 224, 226, 228 (three of which are illustrated) including, for example, a lap-top computer 224, a PDA 226, and a cellular phone 228. However, the present invention is not limited to this embodiment and more, fewer or other components can also be used.

The airport information center 228 sends airport information 230 such as a terminal map, flight schedule and flight update information, airport information, security information, weather and news information and other information to the ISC 24 via the Internet 22 using a security mechanism (e.g., encryption, IP Security protocol ("IPSec"), etc.). The ISC 24 executes Method 120 (FIG. 10) and/or Method 200 (FIGS. 15A and 15B) to forward airport information to the plural location-aware wireless mobile devices 224, 226, 228 over the wireless LAN 220 transport network. The airport information includes one or more network-independent location-aware protocol messages 74, 76, 78.

Figure 17:
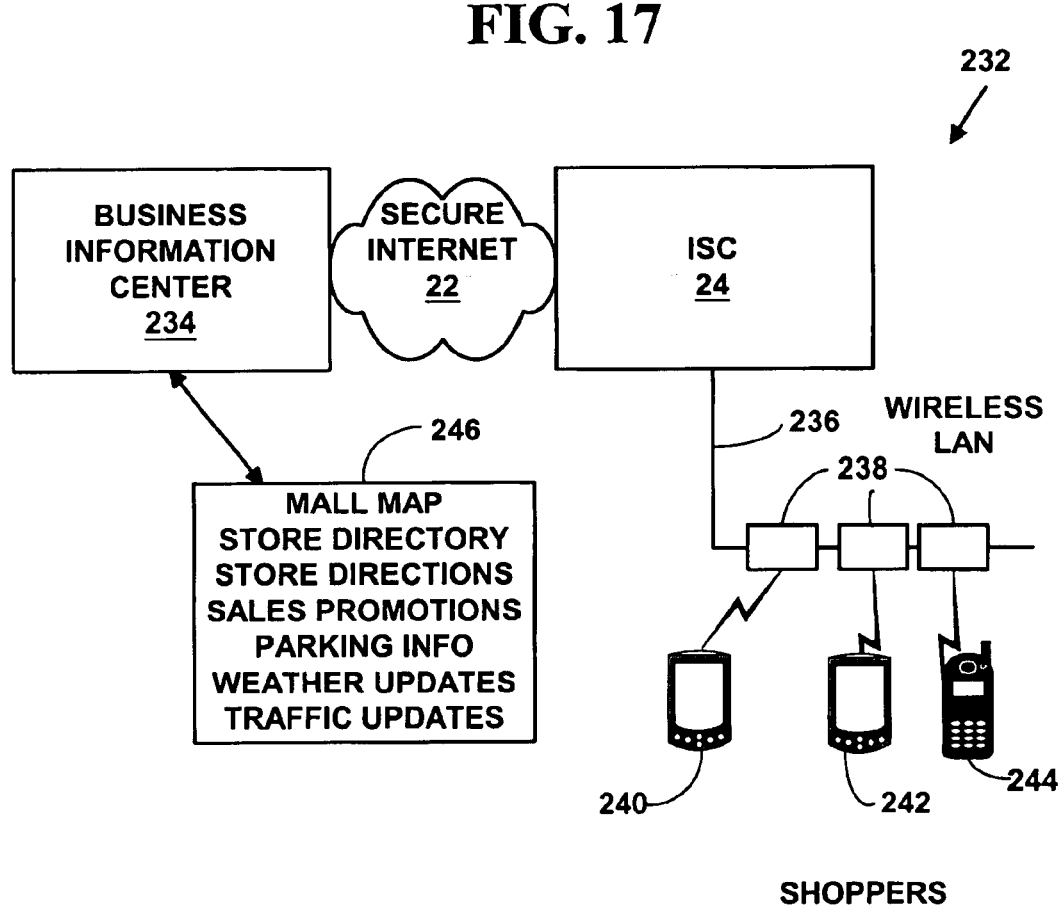
FIG. 17 is a block diagram illustrating an exemplary location-aware network system for a shopping mall.

FIG. 17 is a block diagram illustrating an exemplary location-aware network system for a shopping mall 232. The location-aware network system for a shopping mall 232 includes a business information center 234 a wireless LAN 236 with plural wireless access points 238 (three of which are illustrated), plural location-aware wireless mobile devices 240, 242, 244 (three of which are illustrated). However, the present invention is not limited to such an embodiment and more, fewer or other components can also be used.

The business information center 234 sends shopping information 246 such as a mall map, store directory, store directions, sales promotion, parking information, weather updates, traffic updates and other information to the ISC 24 via the Internet 22 using a security mechanism (e.g., encryption, IP Security protocol ("IPSec"), etc.). The ISC 24 executes Method 120 (FIG. 10) and/or Method 200 (FIGS. 15A and 15B) to forward airport information to the plural location-aware wireless mobile devices 240, 242, 244 over the wireless LAN 236 transport network. The business information includes one or more network-independent location-aware protocol messages 74, 76, 78.

Figure 18:
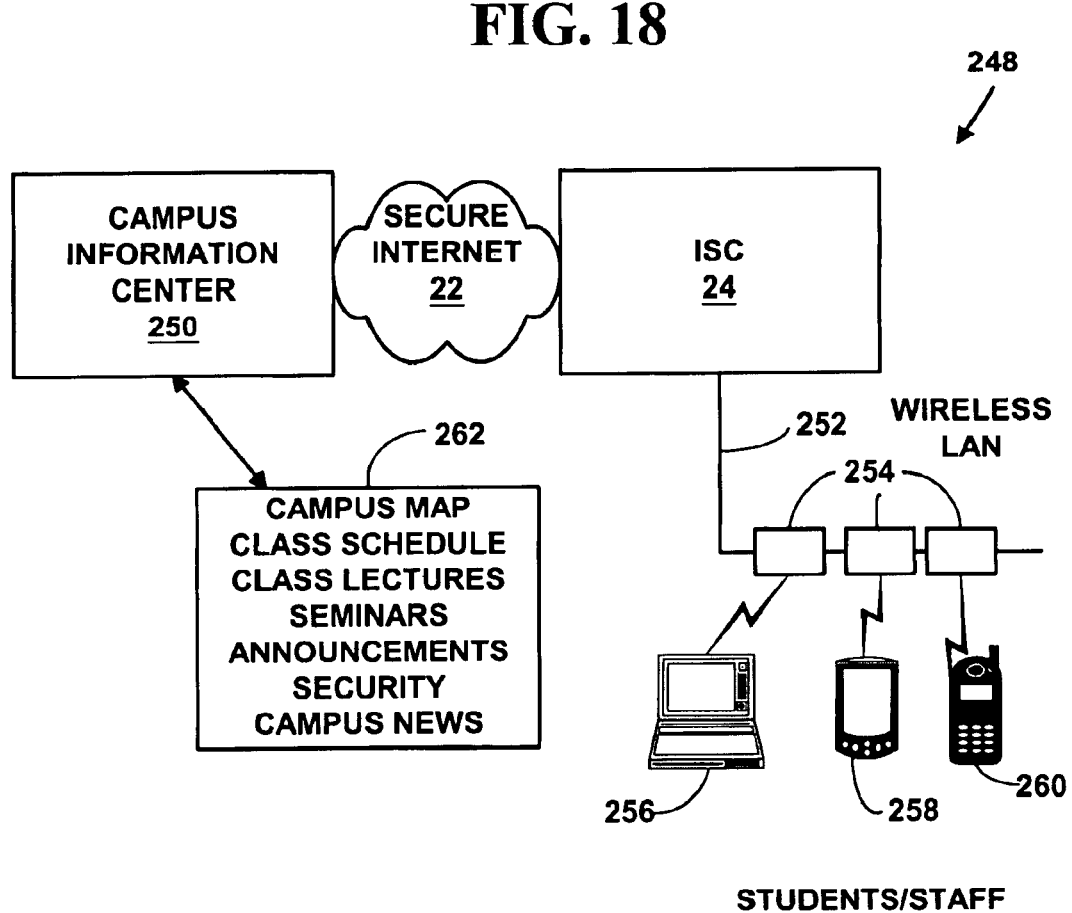
FIG. 18 is a block diagram illustrating an exemplary location-aware network system for a college campus.

FIG. 18 is a block diagram illustrating an exemplary location-aware network system for college campus 248. The location-aware network system for a college campus 248 includes a campus information center 250 a wireless LAN 252 with plural wireless access points 254 (three of which are illustrated), plural location-aware wireless mobile devices 256, 258, 260 (three of which are illustrated).

The campus information center 250 sends campus information 266 such as a campus map, a class schedule, seminar and seminar location information, announcement, security information, campus news, and other information to the ISC 24 via the Internet 22 using a security mechanism (e.g., encryption, IP Security protocol ("IPSec"), etc.). The ISC 24 executes Method 120 (FIG. 10) and/or Method 200 (FIGS. 15S and 15B) to forward airport information to the plural location-aware wireless mobile devices 256, 258, 260 over the wireless LAN 252 transport network. The campus information includes one or more network-independent location-aware protocol messages 74, 76, 78.

Figure 19:
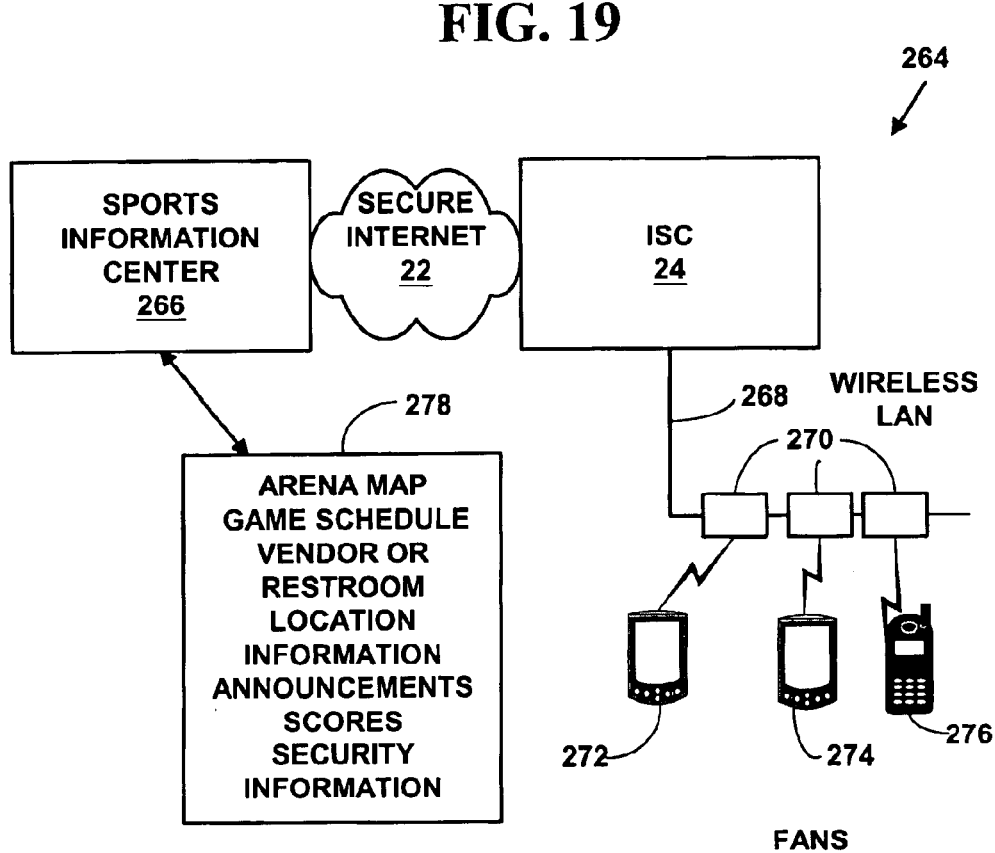
FIG. 19 is a block diagram illustrating an exemplary location-aware network system for a sports arena.

FIG. 19 is a block diagram illustrating an exemplary location-aware network system for a sports arena 264. The location-aware network system for a sports arena 264 includes a sports information center 266 a wireless LAN 268 with plural wireless access points 270 (three of which are illustrated), plural location-aware wireless mobile devices 272, 274, 276 (three of which are illustrated).

The sports information center 266 sends sports information 278 such as an area map, a game schedule, vendor or restroom location information, announcements, security information, scores, and other information to the ISC 24 via the Internet 22 using a security mechanism (e.g., encryption, IP Security protocol ("IPSec"), etc.). The ISC 24 executes Method 120 (FIG. 10) and/or Method 200 (FIGS. 15A and 15B) to forward sports information to the plural location-aware wireless mobile devices 272, 274, 276 over the wireless LAN 268 transport network. The sports information includes one or more network-independent location-aware protocol messages 74, 76, 78.

It should be understood that the programs, processes, methods and system described herein are not related or limited to any particular type of computer or network system (hardware or software), unless indicated otherwise. Various combinations of general purpose, specialized or equivalent computer components including hardware, software, and firmware and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other types of elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for providing network-independent location-aware protocol messages to location-aware mobile network devices, comprising:

accepting alert information from a plurality of information sources on an information repository, wherein the information repository is in communications with the plurality of information sources via an information network, wherein the alert information is generated from emergency or non-emergency events, and wherein the alert information includes information emergency or non-emergency events for a specific geographic area;

formatting the accepted alert information into a network-independent location-aware protocol message, wherein the network-independent location-aware protocol message can be sent to a plurality of different types of location-aware mobile wireless network devices in communications with the plurality of different types of transport networks via a plurality of uniform mobile user network message interfaces associated with the plurality of different types of transport networks;

optionally adding additional information to the network-independent location-aware protocol message based on the specific geographic area identified in the alert information, wherein the additional information is dynamically generated from a plurality of databases associated with the information repository;

forwarding the network-independent location-aware protocol message to the plurality of different types of transport networks in communications with the plurality of different types of location-aware mobile network devices located in the specific geographic area identified by the alert information, wherein the plurality of different types of transport networks forward the network-independent location-aware message to the plurality of different types of location-aware mobile network devices located in the specific geographic area identified by the alert information via the plurality of uniform mobile user network message interfaces associated with the plurality of different types of transport networks.

2. The method of claim 1 further comprising a computer readable medium having stored therein instructions for causing a processor to execute the steps of the method.

3. The method of claim 1 wherein the plurality of different types of transport networks include one or two-way paging, cellular telephone, personal communication services ("PCS"), global system for mobile communications, ("GSM"), "), Generic Packet Radio Services ("GPRS"), cellular digital packet data ("CDPD"), wireless application protocol ("WAP"), Bluetooth, 802.11b, or digital audio broadcasting ("DAB"), transport networks.

4. The method of claim 1 wherein the network-independent location-aware protocol message includes:

a location-aware management message for sending and receiving management messages to and from location-aware wireless mobile devices;

a location-aware event message for sending and receiving emergency or non-emergency event messages to and from location-aware wireless mobile devices; and a location-aware commerce message for sending and receiving commerce messages to and from location-aware wireless mobile devices.

5. The method of claim 4 wherein the location-aware commerce message includes electronic-commerce and mobile-commerce messages.

6. The method of claim 4 wherein the location-aware event messages include weather, traffic or E911, event messages.

7. The method of claim 1 wherein the location-aware wireless mobile devices include one or two way pagers, cellular phones, mobile phones, personal digital assistants, personal communication services ("PCS") devices, global system for mobile communications ("GSM") devices, "), Generic Packet Radio Services ("GPRS") devices, cellular digital Global Positioning System ("GPS") devices, Digital GPS ("DGPS") devices, Wireless Application Protocol ("WAP") devices, Bluetooth, 802.11b, or digital audio broadcasting ("DAB") devices.

8. The method of claim 1 wherein the optional additional information includes text, graphical maps, audio or video information.

9. The method of claim 1 wherein the network-independent location-aware protocol messages are also used to communicate with wired or non-mobile wireless devices.

10. A method for locating and providing network-independent location-aware protocol messages to location-aware mobile network devices, comprising:

dynamically accepting location information from a plurality of different types of location-aware wireless mobile devices on an information repository when a location of a location-aware wireless mobile device changes, wherein information repository is in communications with the plurality of different types of location-aware wireless mobile devices via a plurality of different types of transport networks;

accepting alert information from a plurality of information sources on an information repository, wherein the information repository is in communications with the plurality of information sources via an information network, wherein the alert information is generated from emergency or non-emergency events, and wherein the alert information includes information emergency or non-emergency events for a specific geographic area;

formatting the accepted alert information into a network-independent location-aware protocol message, wherein the network-independent location-aware protocol message can be sent to a plurality of different types of location-aware mobile wireless network devices in communications with the plurality of different types of transport networks via a plurality of uniform mobile user network message interfaces associated with the plurality of different types of transport networks;

optionally adding additional information to the network-independent location-aware protocol message based on the specific geographic area identified in the alert information, wherein the additional information is dynamically generated from a plurality of databases associated with the information repository;

determining whether any location-aware mobile network devices are currently located within the specific geographic area identified by the alert information using the accepted location information, and if so, forwarding the network-independent location-aware protocol message to the plurality of different types of transport networks in communications with the plurality of different types of location-aware mobile network devices located in the specific geographic area identified by the alert information, wherein the plurality of different types of transport networks forward the network-independent location-aware message to the plurality of different types of location-aware mobile network devices located in the specific geographic area identified by the alert information via the plurality of uniform mobile user network message interfaces associated with the plurality of different types of transport networks.

11. The method of claim 10 further comprising a computer readable medium having stored therein instructions for causing a processor to execute the steps of the method.

12. The method of claim 11 wherein the network-independent location-aware protocol message includes:
a location-aware management message for sending and receiving management messages to and from location-aware wireless mobile devices;
a location-aware event message for sending and receiving emergency or non-emergency event messages to and from location-aware wireless mobile devices; and
a location-aware commerce message for sending and receiving commerce messages to and from location-aware wireless mobile devices.

13. The method of claim 12 wherein the location-aware commerce message includes electronic-commerce and mobile-commerce messages.

14. The method of claim 12 wherein the location-aware event messages include weather, traffic or E911, event messages.

15. The method of claim 12 wherein the location-aware wireless mobile devices include one or two way pagers, cellular phones, mobile phones, personal digital assistants, personal communication services ("PCS") devices, global system for mobile communications ("GSM") devices, "), Generic Packet Radio Services ("GPRS") devices, cellular digital Global Positioning System ("GPS") devices, Digital GPS ("DGPS") devices, Wireless Application Protocol ("WAP") devices Bluetooth, 802.11b, or digital audio broadcasting ("DAB") devices.

16. The method of claim 12 wherein the optional additional information includes text, graphical maps, graphics, audio or video information.

17. The method of claim 12 wherein the network-independent location-aware protocol messages are also to communicate with wired or non-mobile wireless devices.

18. The method of claim 10 further comprising:
determining whether any location-aware mobile network devices are currently located within the specific geographic area identified by the alert information using the accepted location information, and if not,
periodically checking the accepted location information to determine whether any location-aware mobile network devices are currently located within the specific geographic area identified by the alert information using the accepted location information, and if so,
forwarding the network-independent location-aware protocol message to a specific transport network in communications with location-aware mobile network devices now located in the specific geographic area identified by the alert information.

19. The method of claim 10 wherein the location information includes a longitude and latitude for a current geographic location.

20. The method of claim 10 wherein the plurality of different types of transport networks include one or two-way paging, cellular telephone, personal communication services ("PCS"), global system for mobile communications, ("GSM"), "), Generic Packet Radio Services ("GPRS"), cellular digital packet data ("CDPD"), wireless application protocol ("WAP"), Bluetooth, 802.11b, or digital audio broadcasting ("DAB"), transport networks.

21. A location-aware network system comprising, in combination,
a network-independent location-aware protocol for communicating with location-aware wireless mobile devices stored as data bits in a predetermined format on a computer readable medium, including:
a location-aware management message for sending and receiving management messages to and from location-aware wireless mobile devices,
a location-aware event message for sending and receiving emergency or non-emergency event messages to and from location-aware wireless mobile devices, and
a location-aware commerce message for sending and receiving commerce messages to and from location-aware wireless mobile devices,
wherein the network-independent location-aware protocol messages can be simultaneously transmitted over a plurality of different types of wireless transport networks for a plurality of different types of wireless location-aware wireless mobile devices in a plurality of different locations in a specific geographic area;
a transport network location-aware interface for communicating with a plurality of different types of location-aware wireless mobile devices in a plurality of different locations in a specific geographic area, including:
a first transport interface component for receiving network-independent location-aware protocol messages from an information repository on a wireless transport network, wherein the network-independent location-aware protocol messages are used to communicate with a plurality of different types of location-aware wireless mobile devices in a plurality of different locations in a specific geographic area,
a second transport interface component for sending transport information from the wireless transport network via one or more wireless transport protocols in use on the wireless transport network to the plurality of different types of location-aware wireless mobile devices in a plurality of different locations in a specific geographic area, wherein the transport information includes network-independent location-aware protocol messages used to communicate with a plurality of different types of location-aware wireless mobile devices in a plurality of different locations in a specific geographic area;
a location-aware mobile device interface for a location-aware wireless mobile device, including:
a first location-aware interface component for receiving transport information on a location-aware wireless mobile device from a wireless transport network via one or more wireless transport protocols in use on the wireless transport network, wherein the transport information includes one or more network-independent location-aware protocol messages used to communicate with a plurality of different types of location-aware wireless mobile devices in a plurality of different locations in a specific geographic area,
a second location-aware interface component for generating device specific information on the location-aware wireless mobile device from the one or more network-independent location-aware protocol messages in the transport information;
a location-aware network server for accepting alert information from a plurality of information sources on an information repository, wherein the information repository is in communications with the plurality of information sources via an information network, wherein the alert information is generated from emergency or non-emergency events, and wherein the alert information includes information emergency or non-emergency events for a specific geographic area, formatting the accepted alert information into a network-independent location-aware protocol message, wherein the network-independent location-aware protocol message can be sent to a plurality of different types of location-aware mobile wireless network devices in communications with the plurality of different types of transport networks via a plurality of uniform mobile user network message interfaces associated with the plurality of different types of transport networks, optionally adding additional information to the network-independent location-aware protocol message based on the specific geographic area identified in the alert information, wherein the additional information is dynamically generated from a plurality of databases associated with the information repository, and forwarding the network-independent location-aware protocol message to the plurality of different types of transport networks in communications with the plurality of different types of location-aware mobile network devices located in the specific geographic area identified by the alert information, wherein the plurality of different types of transport networks forward the network-independent location-aware protocol message to the plurality of different types of location-aware mobile network devices located in the specific geographic area identified by the alert information via the plurality of uniform mobile user network message interfaces associated with the plurality of different types of transport networks; and a plurality of location-aware wireless mobile devices for accepting network-independent location-aware protocol messages.

22. The location-aware network system of claim 21 wherein the location-aware network server further includes:

accepting dynamically location information from a plurality of different types of location-aware wireless mobile devices on an information repository when a location of a location-aware wireless mobile device changes, wherein information repository is in communications with the plurality of different types of location-aware wireless mobile devices via a plurality of different types of transport networks;

determining whether any location-aware mobile network devices are currently located within the specific geographic area identified by the alert information using the accepted location information, and if so, forwarding the network-independent location-aware protocol message to the plurality of different types of transport networks in communications with the plurality of different types of location-aware mobile network devices located in the specific geographic area identified by the alert information.

23. The location-aware network system of claim 21 wherein the location-aware network server further includes:

determining whether any location-aware mobile network devices are currently located within the specific geographic area identified by the alert information using the accepted location information, and if not, periodically checking the accepted location information to determine whether any location-aware mobile network devices are currently located within the specific geographic area identified by the alert information using the accepted location information, and if so, forwarding the network-independent location-aware protocol message to a specific transport network in communications with location-aware mobile network devices now located in the specific geographic area identified by the alert information.

* * * * *